Feb. 2, 1960 C. A. WASHBURN 2,923,851

WAVE-FORM GENERATOR

Filed Dec. 26, 1956 9 Sheets-Sheet 1

INVENTOR
Clayton A. Washburn by Robert S. Dunham

ATTORNEY

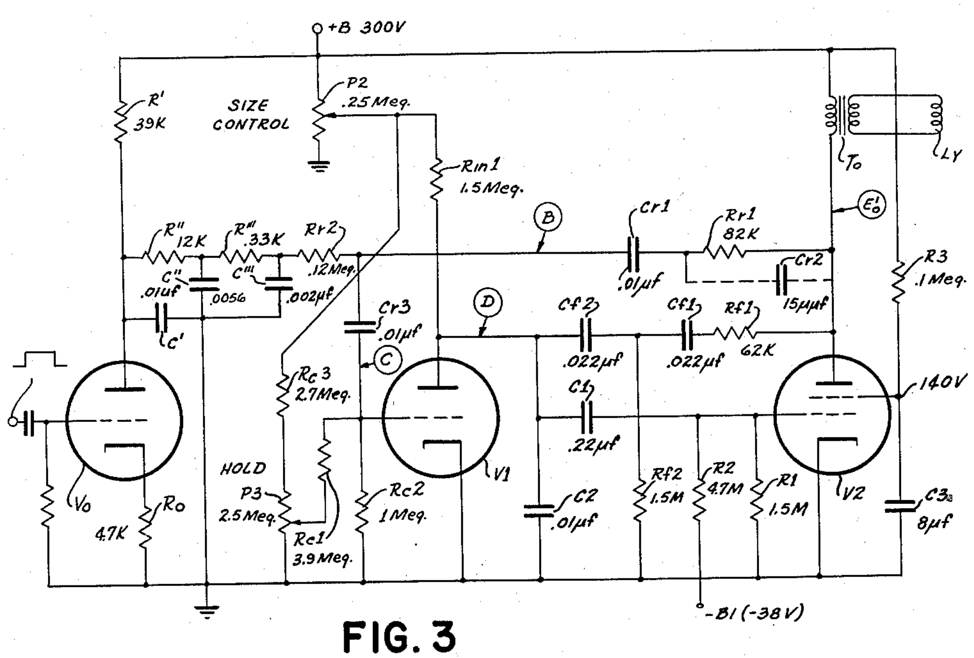

FIG. 3

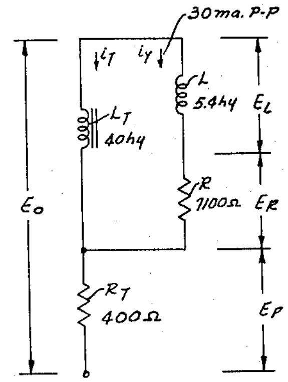

FIG. 4

$L_Y$ = YOKE INDUCTANCE, $R_Y$ = YOKE RESISTANCE
$I_Y$ = YOKE CURRENT (PEAK TO PEAK)
$R_S$ = TRANSFORMER SECONDARY RESISTANCE
$N$ = PRI./SEC. TURNS RATIO
$L_e$ = PRI. LEAKAGE INDUCTANCE
$L_T$ = TRANSFORMER COUPLING INDUCTANCE
$R_T$ = PRI. RESISTANCE
$L = N^2 L_Y + L_e$, $i_Y = I_Y/N$
$R = (R_Y + R_S) N^2$

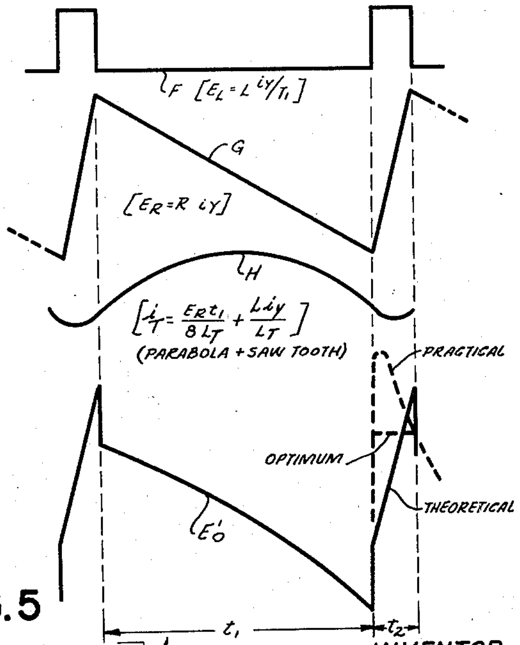

FIG. 5

$E'_O = i_Y L/t_1$ (PULSE)
$+ i_Y [R + R_T(1 + \frac{L}{L_T})]$ (SAW TOOTH)
$+ i_Y R R_T t_1 / 8 L_T$ (PARABOLA)

INVENTOR
Clayton A. Washburn
by Robert S. Dunham
ATTORNEY

Feb. 2, 1960 C. A. WASHBURN 2,923,851

WAVE-FORM GENERATOR

Filed Dec. 26, 1956 9 Sheets-Sheet 3

INVENTOR
Clayton A. Washburn by Robert S. Dunham

ATTORNEY

Feb. 2, 1960 C. A. WASHBURN 2,923,851

WAVE-FORM GENERATOR

Filed Dec. 26, 1956 9 Sheets-Sheet 4

INVENTOR
Clayton A. Washburn by Robert S. Dunham

ATTORNEY

INVENTOR
Clayton A. Washburn
by Robert S. Dunham
ATTORNEY

INVENTOR
Clayton A. Washburn by Robert S. Dunham

ATTORNEY

INVENTOR
Clayton A. Washburn
by Robert S. Dunham
ATTORNEY

Feb. 2, 1960 C. A. WASHBURN 2,923,851

WAVE-FORM GENERATOR

Filed Dec. 26, 1956 9 Sheets-Sheet 8

INVENTOR
Clayton A. Washburn by Robert S. Dunham

ATTORNEY

Feb. 2, 1960 C. A. WASHBURN 2,923,851

WAVE-FORM GENERATOR

Filed Dec. 26, 1956 9 Sheets-Sheet 9

INVENTOR
Clayton A. Washburn by Robert S. Dunham

ATTORNEY

United States Patent Office 2,923,851

Patented Feb. 2, 1960

2,923,851

WAVE-FORM GENERATOR

Clayton A. Washburn, Thornwood, N.Y.

Application December 26, 1956, Serial No. 630,704

30 Claims. (Cl. 315—27)

The present invention relates to electrical waveform generators and, particularly, to those which have a cyclic operation characterized during each cycle by two more or less distinctive periods of dissimilar operational mode.

There are many applications where it is desirable to generate an electrical voltage or current of repetitive wave form and of uniform or controlled periodicity. It is further often desirable that the wave form of the generated voltage or current shall have a carefully specified rate of change of amplitude with time during a portion of each repetitive interval. For example, it may be desirable that its amplitude vary in a linear manner with time during a "scan" portion occupying the major portion of the repetitive interval of the voltage or current, the remaining portion of the repetitive interval being that devoted to the return of the amplitude of the voltage or current to the initial condition or starting point prevailing at the beginning of the repetitive interval. In these applications, the wave form generator has a cyclic operation and is characterized during each cycle by two more or less distinctive periods of dissimilar operational mode. In one of these modes the generated wave form should conform to a carefully specified wave shape throughout an interval which will herein be designated for convenience as a "charge" or "trace" interval, and in the other of which operational modes a return to the initial starting condition of cyclic operation is effected during an interval herein conveniently referred to as a "discharge" or "retrace" interval. Ordinarily the generated wave form during the discharge interval is of secondary importance so long as it does not adversely affect the generated wave form, or appreciably increase the difficulty of attaining the desired wave form, during the charge interval. In many applications, it is desirable that the discharge interval be relatively short compared to the charge interval. Common applications wherein wave form generators of the type just described have utility is in cathode ray oscilloscope deflection circuits, television horizontal and vertical deflection circuits, and the like. A somewhat different and often parallel objective of the operation desired of the wave form generator is to enable utilization of the high voltage which is generated in many applications from the stored energy in a reactive load operating at a high duty ratio (large ratio of charge to discharge intervals) and energized by a current generated by the wave form generator.

Wave form generators of the type mentioned heretofore have conventionally employed separate and distinct circuits for the generation of a control potential of pulse wave form which is then supplied to control the operation of a wave form generator, or they have employed special devices or involved requirements or auxiliary equipment peculiar to a particular application. The use of separate pulse and wave form generators has the important disadvantage of being unnecessarily complex and expensive, and the use of special devices or auxiliary equipment have limitations peculiar to the special devices employed or have limited application due to lack of control of various aspects of the wave form generated.

Typical of the arrangements of the more complex form heretofore used is that wherein a generator is provided to generate a potential of pulse wave form of selected amplitude, pulse duration, and pulse period. This potential is then used to control the conductivity of an electron discharge device which, upon becoming conductive during the generated pulse, discharges a condenser which was previously charged during a preceding nonconductive period of the device and at a controlled rate of charge from a source of charging potential. This arrangement provides a potential of saw-tooth wave form having an amplitude which increases in a positive sense (hereinafter referred to as a "positive" wave) during a relatively long charge interval, the rate of amplitude increase being essentially linear under conditions where the charging source is essentially one of the so-called "constant current" type. Following the charge portion of the generated potential wave form, the potential amplitude decreases rapidly and generally in exponential fashion during the ensuing relatively short discharge interval. Thus in this arrangement the pulse generator drives the wave form generator to generate the output potential of saw-tooth wave form.

In arrangements of the type last mentioned, the degree of approximation to a linear wave form during the charge interval of the output voltage $E_0$ is a function of the ratio of $E_0$ to the resistive voltage drop $E_R$ developed across the source impedance by the charging current, and approaches an ideal constant-current source as the ratio $E_0/E_R$ approaches zero. The discharge device employed in these arrangements is conventionally a vacuum tube of relatively low internal impedance and having a conductance control electrode to which the generated pulse potential is applied with sufficient amplitude to drive the control electrode into a state of conductivity during the pulse interval and thereby cause the control electrode to develop a self-bias potential to bias the discharge device below cut off during the charge portion of the cycle. The degree to which desired linearity of generated wave form obtains is additionally effected by the internal resistance of the discharge device, which decreases as is well known with increasing values of the energizing potential applied across its output electrodes, and by the "stiffness" of its control-electrode drive current provided by the pulse source. The requirement of a high energizing voltage for the discharge device is in opposition to the condition required of the charge source that it provide a constant-current characteristic.

In practical applications of the last described wave form generator, a number of difficulties present themselves. These may include the requirement for relatively large generated voltage or current and power outputs, the requirement of very low or accurately specified generator output impedance, or the requirement that the wave form generator drive a complex load and possibly produce in a particular branch of the load a specified voltage or current varying in a particular manner with time. Thus in using these prior wave form generators, additional amplification and wave shaping by the use of additional circuit components and units of equipment are often necessary, introducing further problems of stability, distortion and the like. Where controlled stability of operating periodicity is required, so-called automatic frequency control arrangements are often employed but these have heretofore necessarily been relegated purely to control of the pulse generator and the frequency characteristic of the latter.

It is an object of the present invention to provide a new and improved electrical wave form generator of relatively simple and inexpensive form and one which avoids many of the disadvantages and limitations of prior generators of the types above mentioned.

It is a further object of the invention to provide an improved electrical wave form generator characterized by ease in the attainment of desired operating characteristics and by high stability in the operating characteristics thus effected.

It is an additional object of the invention to provide a novel oscillatory wave form generating system associated with a novel form of automatic frequency control system to enhance the stability and phase-controlled synchronization of the oscillatory system from an external synchronizing source.

It is a further object of the invention to provide an electrical wave form generator of novel construction enabling ready adjustments of certain of the generated wave form characteristics relatively independently of certain other wave form characteristics.

Other objects and advantages of the invention will appear as the detailed description proceeds in the light of the drawings forming a part of this application and in which:

Fig. 1 is a circuit diagram representing an embodiment of the invention, and Fig. 2 graphically represents certain voltage relationships prevailing during operation of the Fig. 1 arrangement.

Fig. 3 represents a wave form generator embodying a modified form of the invention suitable for energizing an inductive load with a current of linear saw-tooth wave form, Fig. 4 is a simplified schematic arrangement representing the essential impedance elements of the energized load, and Fig. 5 graphically represents current and voltage relationships occurring during operation of the Fig. 3 generator;

Fig. 6 graphically represents the operating characteristics of a novel low pass filter employed in the Fig. 3 generator;

Fig. 7 represents an additionally modified form of the invention particularly suitable for developing one or more output high unidirectional potentials, and Fig. 8 graphically represents voltage relationships occurring during operation of this form of generator;

Fig. 9 is a circuit diagram representing a form of the invention suitable for energizing a scanning winding with a current of linear saw-tooth wave form while concurrently employing a boost circuit to improve the operating efficiency and a novel automatic frequency control system for synchronizing the system operation, and Fig. 10 graphically represents specified voltage and current relationships prevailing during the operation of the Fig. 9 generator;

Figure 1:
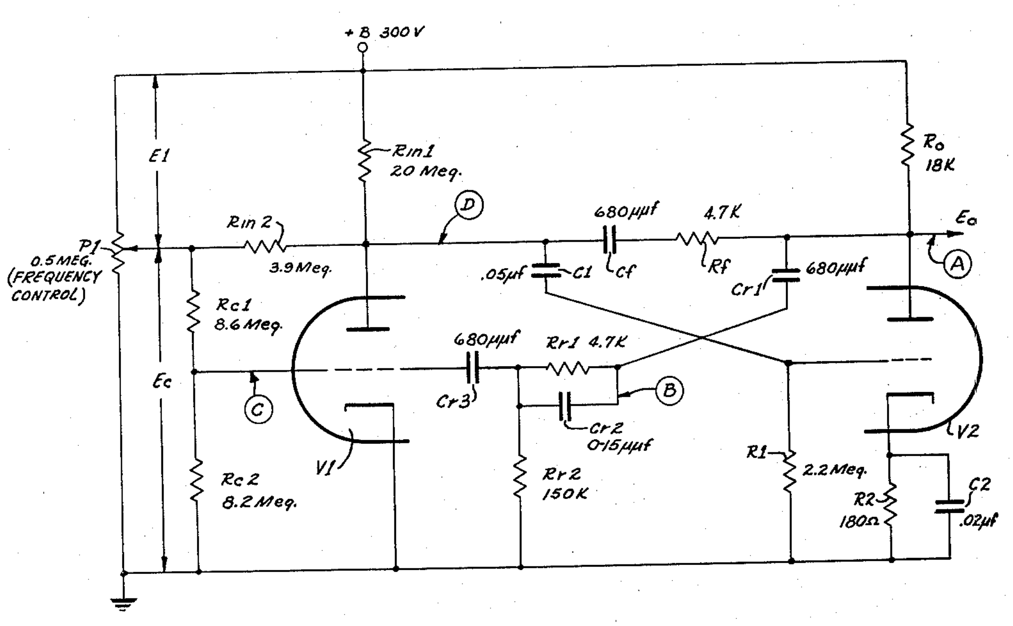

Referring now more particularly to Fig. 1 of the drawings, there is represented a wave form generator embodying the present invention in a particular form suitable for the generation of an output potential of saw-tooth wave form such as is desirable in oscilloscope applications. It is characteristic of this form of oscillatory system, as in other embodiments of the invention later to be described, that (1) the amplitude of the generated output potential may be controlled over a wide range of values without appreciably affecting its periodicity or frequency or the ratio of its trace to retrace intervals, and (2) conversely that the periodicity or frequency of the generated output potential may be varied over a wide range without appreciably affecting its amplitude. In this, independent adjustable controls may be provided for amplitude and frequency adjustments, a frequency adjustment being shown as provided in the Fig. 1 arrangement by way of example.

The oscillatory system shown in Fig. 1 includes a triode form of vacuum tube V1 having a control electrode to which a suitable unidirectional bias potential is applied from a source of potential indicated as +B and the adjustable tap of a potentiometer P1, a portion of the potential selected by adjustment of the latter being applied to the control electrode of the tube V1 by use of a potential divider comprising series resistors Rc1 and Rc2. As will presently become more fully apparent, there is developed at the control electrode of the tube V1 a potential of pulse wave form. The latter has an amplitude suitable to control the conductivity of the tube V1 for purposes of discharging during a discharge interval, a condenser presently to be identified. This condenser charges, during a charging interval, from the source of potential +B through a resistor R*in*1 of relatively large value which also couples the potential source +B to the anode of the tube V1.

The anode of the tube V1 is coupled through a series condenser C1 and a grid resistor R1 to the control electrode of a tube V2 which operates as a class A amplifier by virtue of a self-bias potential developed across a cathode resistor R2 and shunt-connected condenser C2. The anode of this tube is connected to the anode potential source +B through an anode load resistor $R_0$ and the output generated potential $E_0$ of saw-tooth wave form is generated at the anode of the tube V2.

The condenser earlier mentioned as being charged and discharged, during the respective nonconductive and conductive intervals of the tube V1 is comprised by a condenser C*f* included with a resistor R*f* in a degenerative feed-back path which is connected directly between the anode of the tube V1 and the anode of the tube V2 and is also coupled through the condenser C1 between the anode and control electrode of the tube V2. To render the system self-oscillatory, the anode of the tube V2 is coupled to the control electrode of the tube V1 through a regenerative feed-back path which includes three series connected condensers C*r*1, C*r*2, and C*r*3, a resistor R*r*1 connected in shunt to the condenser C*r*2, and a resistor R*r*2 connected between the junction of the condensers C*r*2 and C*r*3 and the cathode of the tube V1. A potentiometer P1 is connected across the potential source +B and provides in conjunction with voltage divider resistors Rc1 and Rc2 an adjustable value of bias for the control electrode of the tube V1 by which to control the frequency of oscillation of the oscillatory system. A resistor R*in*2 is connected between the anode of the tube V1 and the adjustable contact of the potentiometer P1 by which to vary the anode potential of the tube V1, with adjustments of the potentiometer, sufficiently to maintain constant the amplitude of the generated output potential $E_0$.

Figure 2:
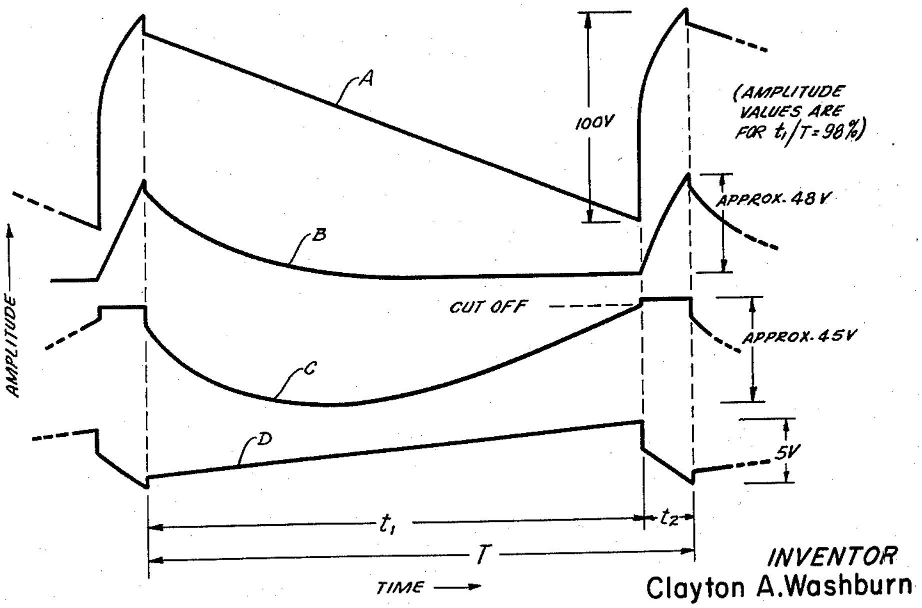

Consider now the operation of the oscillatory system just described, and refer to the curves of Fig. 2 which graphically represent operating potentials appearing at selected points in the oscillatory system. It will be noted that, due to the interconnections of the anodes and control electrodes of the tubes V1 and V2 and due to the position of the condenser C*f* between the anodes of the tubes, the potentials at the terminals of the condenser C*f* varies in opposite senses as the tubes V1 and V2 become alternately conductive. That is, when the tube V1 is rendered conductive and its anode potential accordingly drops, the tube V2 is rendered less conductive and its anode potential tends to rise; conversely, when the tube V1 becomes nonconductive and its anode potential tends to rise, tube V2 becomes more fully conductive and its anode potential tends to drop. It will further be noted that the condenser C*f* and resistor R*f* are coupled through the condenser C1 in degenerative relation between the anode and control electrode of the tube V2, thus substantially linearizing its operating characteristics and decreasing its output electrode resistance. As more fully explained in applicant's United States Patents Nos. 2,562,305, 2,594,104 and 2,681,411, the net result of this degenerative feedback circuit of the tube V2 is such as to tend to cause the anode potential of the charge of the tube V2 to vary quite linearly with time during the charge or trace interval $t_1$ as represented by curve A of Fig. 2. This characteristic is particularly important during the interval last mentioned since it is then that the condenser C*f* is charging from the potential source +B through the resistor R*in*1. Thus the generated output potential $E_0$ of sawtooth wave form is caused to have a very linear wave form portion during the charge interval.

Considering now the oscillatory nature of the system operation, it may be mentioned at the outset that the function of the resistor R*f* in the degenerative feed-back network is to produce a small pulse component in the output voltage wave form. This component compensates for the capacitive load introduced by the feed-back network components, and also provides sufficient direct gain in the amplifier V2 as to insure abrupt switching action in the discharge tube V1 by causing the generation at the control electrode of the latter of a pulse potential having relatively sharp potential rise and fall characteristics. During the discharge interval $t_2$, the control electrode of tube V1 is driven to a conductive state by the output voltage $E_0$ and the resulting flow of control electrode current charges the condensers C*r*1 and C*r*3 to a potential determined by the amplitude of the output voltage $E_0$. In this, the potential at the lower terminal of the condenser C*r*1 rises during the discharge interval as indicated by curve B. As the charging of these condensers progresses, a point is reached where they are sufficiently charged that the control electrode of the tube V1 tends to drop. When this occurs the control electrode potential drops rapidly below anode current cut off, as represented by curve C, due to the interconnections of the control electrodes and anodes of the tubes V1 and V2 and in particular the resultant discharge of the condenser C*r*1 through the resistor R*r*2. This terminates the discharge interval $t_1$ and initiates the charge interval $t_2$. The control electrode potential of the tube V1 eventually begins to rise again, as shown by curve C, until it again has a value above anode current cut off and this again renders the tube V1 conductive to terminate the charge interval $t_2$ and initiate the discharge interval $t_1$. The condenser C*r*2 is a relatively small high-frequency coupling condenser and accordingly has effect only in slightly modifying the discharge interval.

It will accordingly be seen that the control electrode of tube V1 controls the discharge conductivity of this tube in accordance with a potential of pulse wave form developed at this control electrode by the oscillatory action of the system. The variation of anode potential of the tube V1 during the charge and discharge intervals is represented by curve D. Due to the gain of the tube V2 operating essentially as a linear amplifier, it will be noted that if its value of gain is G the output voltage $E_0$ has an amplitude G times the amplitude of voltage variation represented by curve D and appearing at the anode of the tube V1. At the same time, the degenerative feedback earlier mentioned reduces the distortion, noise and instability of the operating characteristics of the tube V2 to $1/G$ of the value which would otherwise obtain were the feed-back not provided. The feed-back network has the further effect that the effective output impedance of the amplifier comprised by tube V2 is reduced thus making it insensitive to changes in the amplifier effective load impedance.

While the regenerative network is shown as an illustrative one in an oscillatory system having a variable frequency from approximately 200 cycles per second to 1,000 cycles per second, it will be understood that it and the degenerative network may be altered and in some instances simplified depending upon the operating requirements and particularly the discharge wave form characteristics desired. In general the ratio of discharge to charge interval is a function of the relative impedance of the degenerative to regenerative network time constant. The discharge interval characteristics of operation may be altered by appropriate selection of the regenerative network time constants and component arrangement, and the frequency versus amplitude characteristic of the system may be selected by the relative discharge rate of the potential at the control electrode of the tube V1 compared to the charging rate at the anode of this tube. Adequate circuit design information requires a knowledge of the characteristics of the discharge tube V1 for positive control electrode operation. Since the control electrode impedance of typical tubes in the positive voltage region is so low compared to driving circuit impedances, actual control electrode to cathode potential drop is of little consequence in the circuit operation and a knowledge of the potential characteristic of little value. On the other hand, the control electrode drive current can be accurately determined and operating conditions normally established from a knowledge of the relationship between control electrode current, anode current, and anode voltage.

By adjusting the unidirectional operating bias applied to the control electrode of the tube V1, as by adjustment of the potentiometer P1, the charge interval may be varied by varying the time at which the control electrode of the tube V1 permits this tube to become conductive after it has been rendered nonconductive. In effect, adjustment of the potentiometer P1 varies the control electrode cut off potential level with respect to the variation of control electrode potential represented by curve C, and thereby enables an adjustment of the operating cyclic periodicity or frequency of the system to be varied with adjustment of the potentiometer. Since this involves a change in the charge interval, and thereby would ordinarily result in a change of amplitude of the variable potential developed at the anode of the tube V1 (and a corresponding change of amplitude of the output potential $E_0$), the resistor R*in*2 effects a change of the average anode potential of the tube VI sufficient to counteract the variation otherwise occurring and thus maintain substantially constant the amplitude of the output potential $E_0$. Considering this aspect of the operation in a little more detail, it was previously noted that the amplitude of the output potential $E_0$ is proportional to the amplitude of the varying anode potential of the tube V1 which in turn is proportional to the condenser C*f* charging current times the charge interval in seconds. However, the latter is determined by the discharge rate of the tube V1 control electrode circuit (principally $Ec/Rc1$) and the initial charge voltage which is again proportional to $E_0$. As a result, a change of frequency by altering the bias potential E*c* must be accompanied by a change of the average anode voltage to restore the original amplitude, and conversely a change in the average anode voltage must be accompanied by a change in the operating bias E*c* to restore the original frequency. Thus the resistor R*in*2 provides a cross-coupling network component between the frequency and amplitude control points to provide an independently adjustable frequency control characteristic.

It will be apparent from the foregoing description of the Fig. 1 wave form generator that it is of relatively simple and inexpensive construction, and it has the characteristic that the generated output potential has a well defined wave form of highly constant amplitude. The power level required in the output circuit of the amplifier stage V2 is usually much more than necessary to drive the control electrode of the tube V1 during the retrace interval; so that it is possible to obtain adequate drive power and thus enable high stability of the operating characteristics of the generator while at the same time enabling wide design flexibility in controlling the oscillator discharge interval characteristic. The component values and operating potential amplitudes shown in Figs. 1 and 2 are, as in the case of subsequent embodiments later to be described, merely given as representative of one typical embodiment of the invention.

Fig. 3 represents the circuit arrangement of a wave form generator for generating a potential of relatively low periodicity, of the order of 60 cycles per second, suitable for energizing a winding of a scanning yoke to provide a magnetic scanning field having a linear change of amplitude during a charge or trace interval and which varies from a maximum intensity in one sense to an equal value of maximum intensity of opposite sense during this interval. This arrangement is accordingly suitable for providing magnetic deflection in the "vertical" scanning system of a television receiver or monitor picture tube, an image pick up or camera tube, or similar application. In these applications, the principal operating characteristics of interest include the generation of a linear current in a reactive load (the scanning yoke winding) energized through a transformer used for purposes of matching the impedance of the driving source to the impedance of the load, an essentially constant but low operating periodicity with provision for external synchronization, and provision for adjustment of the amplitude of the generated potential over a relatively wide amplitude range without affecting synchronization.

The wave form generator of Fig. 3 is essentially similar to that of Fig. 1, and similar components are identified by similar reference indicia, except for certain differences presently to be noted. Thus the vacuum tube V1 is the discharge tube (and the tube V2 shown as of a tetrode type) is the output class A amplifier. The control electrode of the latter has applied thereto a suitable fixed operating bias from a source of negative potential −B1 through a voltage divider comprised by a resistor R2 and the resistor R1. As in the case of the corresponding tube of Fig. 1, the tube V2 of the present arrangement operates under control of a degenerative feed-back network to insure a relatively constant value of charging current through a condenser C*f*1. The value of the charging current is selected by adjustment of a "size" control potentiometer P2. The wave-form controlling degenerative network includes the condenser C*f*1 and a condenser C*f*2 in series, which together correspond to the condenser C*f* of Fig. 1, and includes a resistor R*f*1 which corresponds to the resistor R*f* of Fig. 1. Since the present wave form generator will normally be used in an equipment also having a higher-frequency wave form generator which generates a higher-frequency "horizontal" scanning current, and since this higher-frequency scanning signal or frequency components thereof may find their way into the input circuit of the tube V1, a condenser C2 is connected in shunt to the output electrodes of the tube V1 to prevent any frequency components of the higher-frequency horizontal scanning signal being applied to the vacuum tube V2. In this, C2 is a high-frequency by-pass condenser and does not appreciably affect the wave form of the low frequency generated output potential.

The operation of the present wave form generator is synchronized by vertical synchronizing pulses applied to the input electrodes of a conventional amplitude clipper stage including a vacuum tube $V_0$. The synchronizing pulses translated by the latter are applied to the control electrode of the tube V1 through a low pass RC filter network, comprised by an input resistor R′ and series resistors R″, R‴ and R*r*2 and by shunt condensers C′, C″ and C‴, and a series coupling condenser C*r*3. A small range of frequency control of the wave form generator, for proper synchronized operation, is provided by a "hold" potentiometer P3 which is connected through a resistor R*c*3 between the adjustable contact of the potentiometer P2 and ground and which adjusts the unidirectional operating bias applied by the resistors R*c*1 and R*c*2 to the control electrode of the tube V1.

The generated potential of the present generator energizes a winding $L_Y$ of a scanning yoke through a transformer $T_0$. It is usually desired that the generated potential have such wave form as to produce a magnetic field the intensity of which varies linearly with time as earlier mentioned. Thus in order to determine the electrical configurations of both the degenerative and regenerative feedback networks employed in the wave form generator, it is first necessary to consider the characteristics of the load impedance presented to the generator. Fig. 4 represents the equivalent circuit of the load impedance and indicates all impedance components which affect the operation at the relatively low vertical deflection frequency. Fig. 5 represents graphically the wave forms of voltages and currents in each branch of the load impedance, starting with the initial assumption of a linear current through the yoke branch and concluding with the wave form of the output voltage $E_0'$ necessary to accomplish this.

As is well known, the inductive components of the load impedance require for linear current therethrough that the output voltage $E_0'$ have a component of pulse wave form as represented by curve F. As is further well known, the resistive components of the load impedance require that the output voltage $E_0'$ have a saw-tooth component as represented by curve G. It is also necessary that the output voltage $E_0'$ have a rather large amplitude parabolic component as represented by curve H. The relative amplitude values of these several components are mathematically expressed by the several equations associated with curves F, G, H and $E_0'$. The resultant required wave form of the output potential $E_0'$ is accordingly that represented by curve $E_0'$ and it will be noted that its wave form during the discharge or retrace interval $t_2$ is indicated in dashed lines as having an "optimum" configuration which is exceedingly difficult to obtain in practice, is further indicated in solid lines as having a mathematically derived theoretical wave form, but is further shown in broken lines as having a peaked configuration which will usually prevail in a practical application.

As previously noted, the wave form of the output potential $E_0'$ during the trace or charge interval $t_1$ of the operating cycle is essentially determined by the degenerative feed-back network, comprised by the components R*f*1, R*f*2, C*f*1 and C*f*2. The required pulse component wave form (curve F) of the output potential $E_0'$ is established by the resistor R*f*1 of this degenerative feed-back network, the required saw-tooth component wave form (curve G) by the combined effect of the condensers C*f*1 and C*f*2, and the required parabolic component wave form (curve H) by the resistor R*f*2 connected between the junction of the condensers C*f*1 and C*f*2 and ground. The amplifier tube V2 usually exhibits a certain amount of nonlinear parabolic-function input-output characteristic as is well known, and the parabolic component provided by the resistor R*f*2 may also furnish an additional component for compensating this nonlinear characteristic of the tube V2.

While the general purpose and function of the feedback networks are similar to those described in connection with Fig. 1, and curves B, C and D of Fig. 2 represent the wave form of potentials appearing at corresponding points in the present wave form generator, the operating conditions and requirements of the present generator are more severe. The pulse component of the output potential $E_0'$, represented by curve F, although small compared to the saw-tooth component (curve G) during the charging interval may become quite large during the discharge interval due to the large ratio of charge to discharge intervals and to the reactance of the output load. A constant amplitude of the output potential $E_0'$ during retrace or discharge interval as represented by the dash-line portion of curve $E_0'$ is desirable in many applications because it limits the maximum pulse amplitude to a minimum value. The degenerative and regenerative network configurations shown, while approaching the latter condition as a limiting value, represent a reasonable compromise between simplicity and ideal operation. In this, and as in the arrangement of Fig. 1, the ratio of regenerative to degenerative network impedances and the control electrode to cathode conductive impedance of the tube V1 determine the discharge interval. While the condenser Cr2 is indicated in broken lines as connected in shunt to the resistor Rr1 as in the Fig. 1 arrangement, and having the purpose as in Fig, 1 of providing high-frequency switching response, the present wave form generator has well defined switching points between the charge and discharge intervals so that the condenser Cr2 ordinarily may be dispensed with in the present generator.

It is desirable in low frequency wave form generators of the type described that provision be made for adjusting the amplitude of the output potential $E_0'$ without at the same time appreciably modifying the frequency. It was explained in connection with Fig. 1 that amplitude and frequency adjustments are interrelated, and in the Fig. 3 generator amplitude adjustments with frequency stability are effected by energizing the control electrode bias potentiometer P3 from the adjustable tap of the size control potentiometer P2. When the ratio of voltage division is properly selected in the interconnection of the potentiometers P2 and P3, the operating frequency of the generator remains essentially constant and independent of adjustments of the size control potentiometer P2. For example, in an actual embodiment of the Fig. 3 generator the voltage at the adjustable contact of the size potentiometer P2 could be adjusted over the range from 100 to 300 volts while the corresponding frequency variations were only between 64.5 and 60.5 cycles per second. Since the maximum intensity of the scanning field in the scanning yoke (and therefore the size of the scanned image) varies almost proportional to the potential at the adjustable contact of the potentiometer P2, it will be seen that in the actual embodiment last mentioned a variation of size of three-to-one results (in the absence of controlled synchronization) in a frequency change of only four cycles per second.

Figure 6:
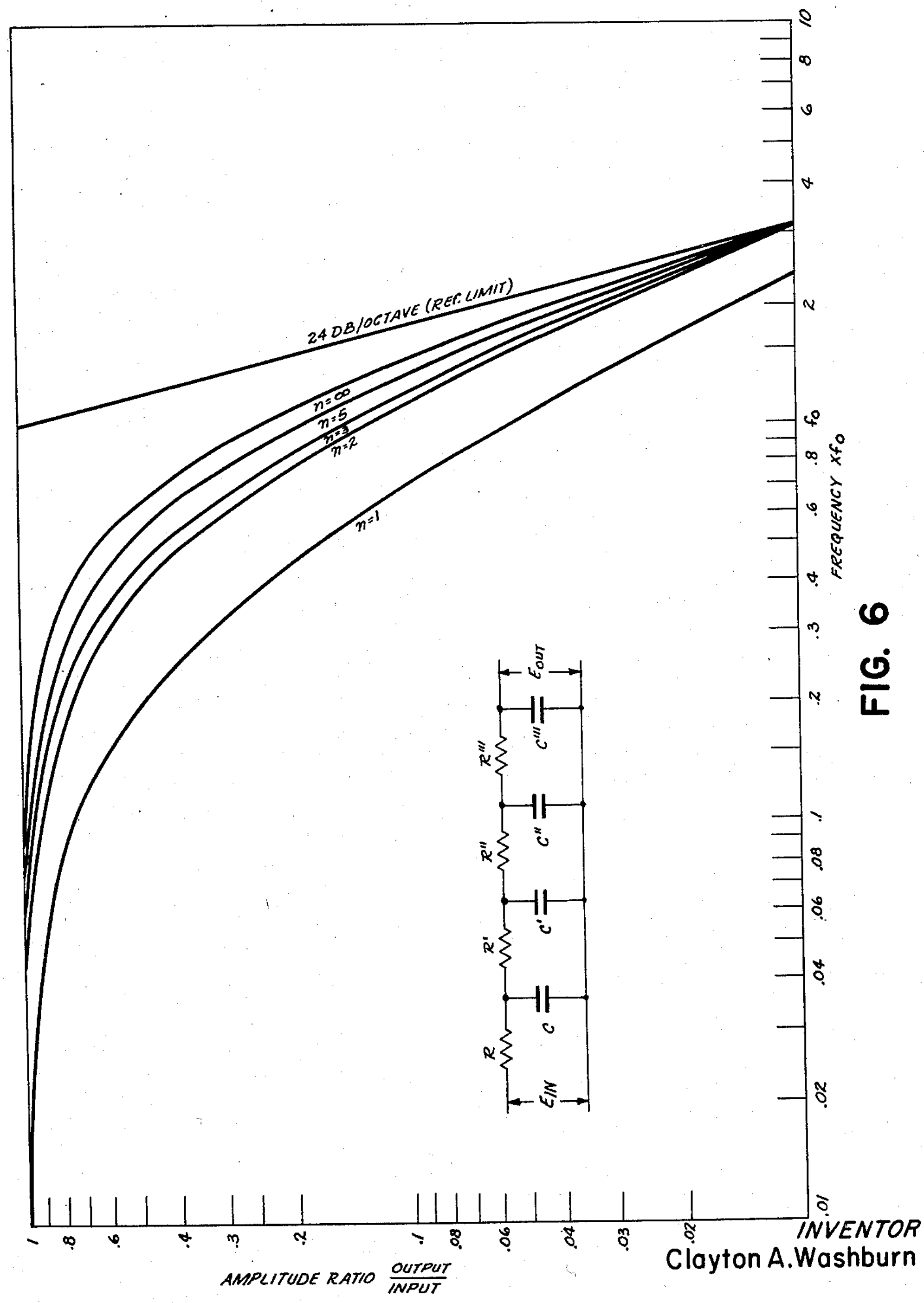

The low pass RC network, comprised of the resistors R′, R″, R‴ and Rc2 and the shunt condensers C′, C″ and C‴ involves a conventional network configuration. However, applicant has discovered that substantially improved effectiveness of this network may be attained by so selecting the values of the network components that the impedance of each filter section (i.e., the section R′C′, R″C″, and so forth) is increased by a fixed ratio while maintaining the time constant $R \times C$ of each section constant. Fig. 6 evidences this improvement graphically, the several curves there shown indicating the input-output amplitude ratio versus frequency of the overall filter network for various values $n$ of the impedance ratio selected from successive filter sections. It will be observed that the filter efficiency rapidly improves as the impedance ratio $n$ is increased. In the vertical synchronizing application, the spread in frequency between vertical synchronizing pulse components and horizontal synchronizing pulse components is quite narrow due to the harmonic content of the former, and it will therefore be appreciated from Fig. 6 that the network performance can be substantially improved by selecting a larger impedance ratio $n$ than conventionally used. Also this has the advantage that the effective circuit impedance is increased to result in a larger output voltage for the network for a given value of drive current into the network.

The wave form generator just described is characterized by excellent inherent frequency stability, excellent linearity of wave form during the scan or charge interval, good amplitude stability of the generated output voltage, and involves improved circuit simplification. The generated output voltage amplitude during the retrace or discharge interval may readily be minimized thus to minimize the insulation requirements on the output amplifier tube, the output transformer, and the scanning yoke. By way of example, a conventional vertical blocking oscillator as heretofore used has a retrace or discharge interval of less than 100 microseconds (long discharge intervals are difficult to achieve, and the methods and means of lengthening this interval are not well understood). The present wave form generator may not only be readily designed for a given retrace interval (for example 400 microseconds) but in addition may provide a relatively flat topped output voltage wave form throughout the interval.

In using wave form generators of the type above described for generation of output potentials of intermediate frequency (say 5,000 cycles per second) or higher frequency (say 18,000 cycles per second), it is only necessary to make appropriate modifications in the component arrangement and component values of the regenerative and degenerative feed-back networks. Typical applications of such higher frequency generators are those used for generating an output voltage of suitable wave form to produce a current of linear saw-tooth wave form through a horizontal scanning winding of a deflection yoke, and in these instances a principal change to the feed-back networks is made to adjust for the increase of the pulse voltage component of the output voltage required with increasingly higher values of frequency. In addition, the high frequency response of the oscillatory system and its components (including for example stray capacitances) becomes of increasing importance.

Figure 7:
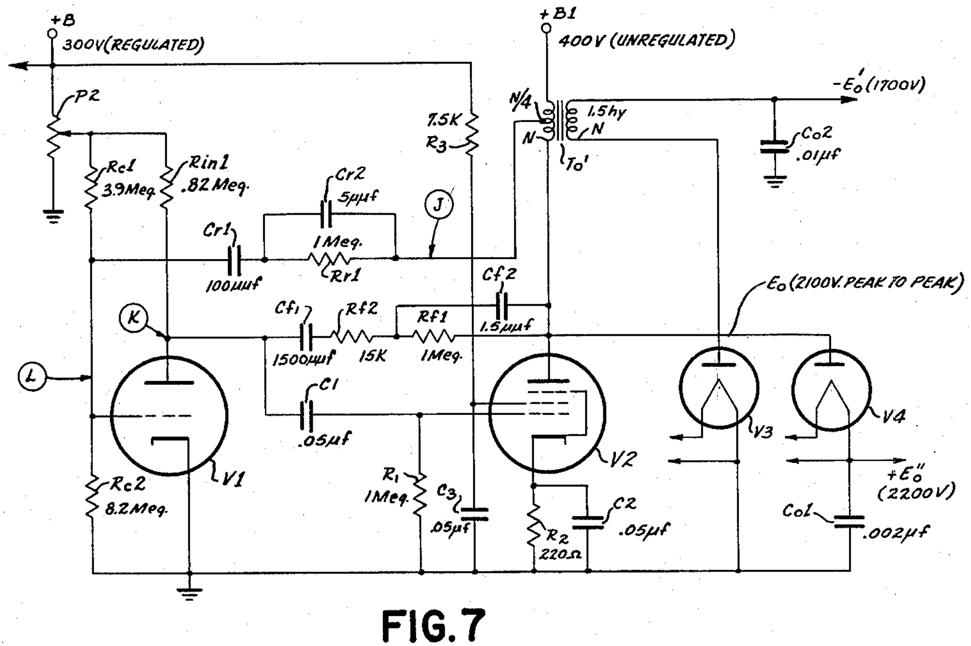

A wave form generator suitable for higher frequency applications is shown in Fig. 7 and includes a circuit arrangement essentially similar to those heretofore described. Thus the degenerative feed-back network includes two series resistors Rf1 and Rf2 which together correspond to the resistor Rf of Fig. 1, and includes a condenser Cf2 (connected in shunt to the resistor Rf1) and a series condenser Cf1 of which the condenser Cf1 corresponds in function to the condenser Cf of Fig. 1. The regenerative feed-back network is essentially similar to that employed in Fig. 1 except that it is simplified by embodying several components used in the latter as will be evident by inspection. Amplitude or size control is effected by use of the potentiometer P2 as in Fig. 3, thus attaining an adjustable amplitude characteristic with good frequency stability. By way of indicating the broad utility of wave form generators embodying the present invention, the present generator is shown coupled through the output transformer $T_0'$ to a diode rectifier V3 and to a filter condenser $C_02$ to provide a high unidirectional negative potential $-E_0'$ whereas the output voltage $E_0$ is directly rectified by a diode rectifier V4 to develop across a filter condenser $C_01$ a positive unidirectional voltage $E_0''$. These unidirectional voltages are suitable for use in energizing electrostatic types of oscilloscope tubes.

If desired, the output transformer $T_0'$ may also drive a deflection yoke winding as in the Fig. 3 arrangement and in this instance the present wave form generator is particularly suitable in low power applications where class A operation of the amplifier tube V2 is not economically objectionable such as in horizontal drives for monoscopes, vidicons, and low-voltage low-angled direct view tubes (i.e., view finders, monitors, etc.).

Figure 8:
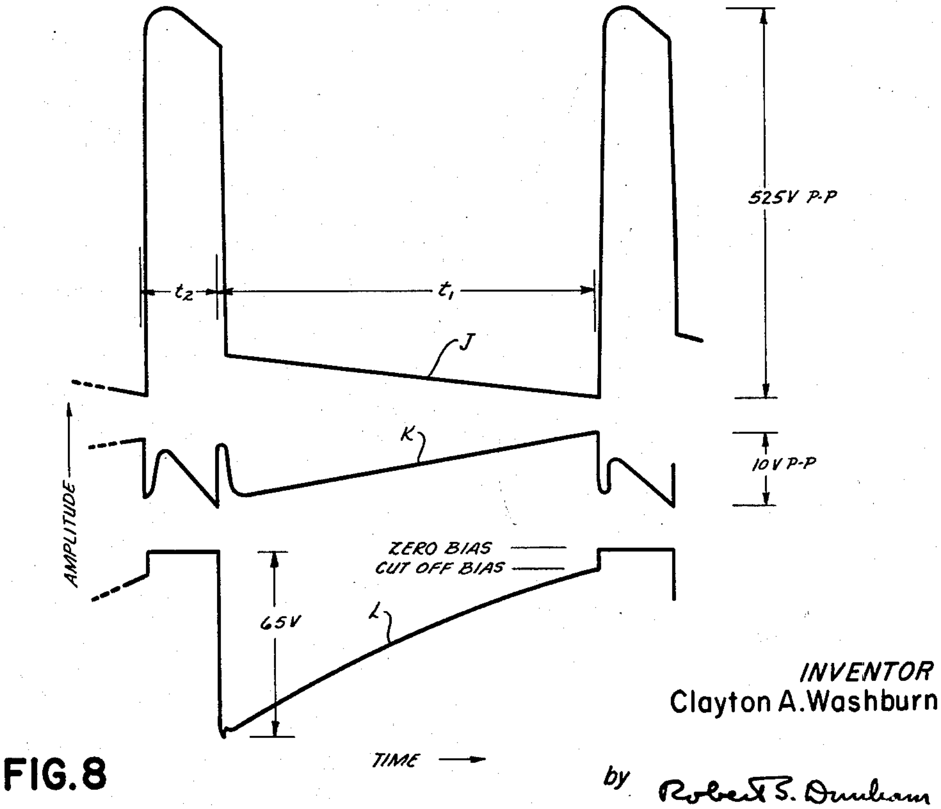

In applications of the generator where high unidirectional output voltages are desired, the wave form of the generated output potential $E_0$ during the retrace or discharge interval is deliberately made to be more peaked in character and the discharge interval is made shorter by selection of the component values in the regenerative feed-back network. Thus curve J of Fig. 8 represents the voltage at the tap on the primary winding of the output transformer $T_0'$ and it will be seen that the pulse component of this voltage has much larger amplitude. Curve K represents the corresponding anode voltage of the tube V1, and curve L represents the control electrode voltage of this tube under the conditions last described. The present wave form generator provides a relatively low impedance output and can be regulated against line voltage variation simply by regulation of the +B amplitude control voltage.

Figure 9:
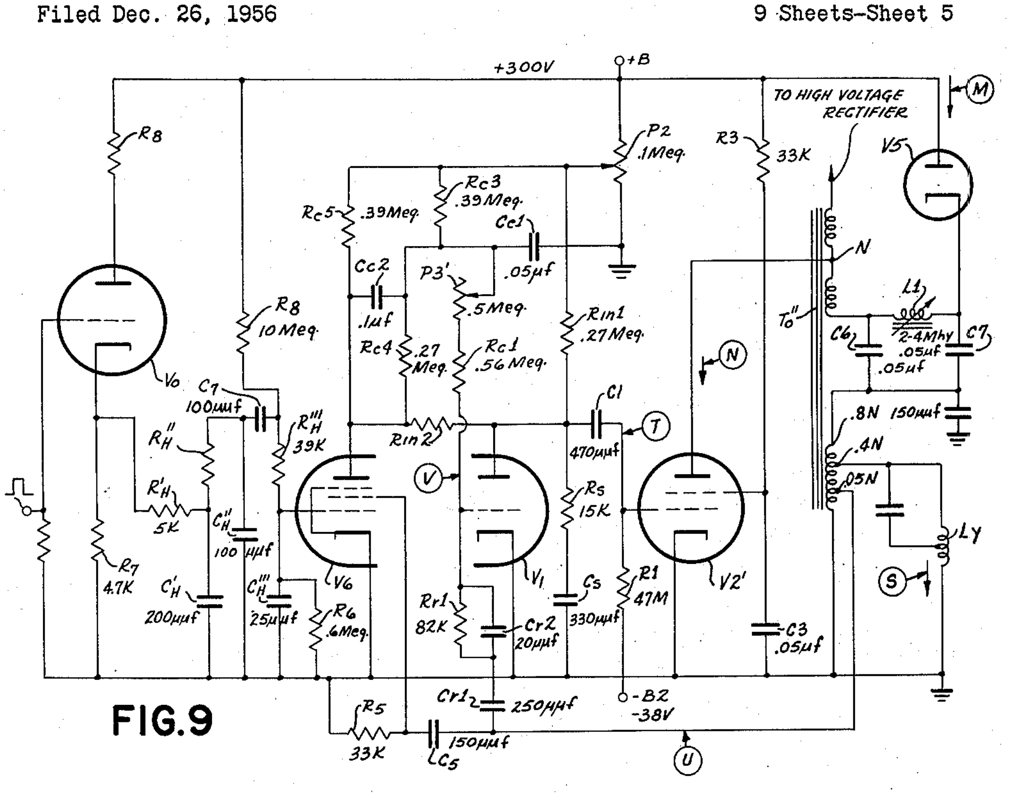

The wave form generators above described utilize a class A output amplifier to drive a load impedance with a voltage or current of wave form determined by a wave forming degenerative feed-back network, a regenerative feed-back network causing the generator to be self-oscillatory without interfering in any sense with the operation of the output amplifier. Fig. 9 is a circuit diagram of a wave form generator in which an operation somewhat analogous to that last mentioned can be obtained by causing the discharge interval to be established by the load impedance. Such an arrangement has utility as the horizontal deflection system of a television receiver wherein the amplifier tube V2' is so biased from a potential source −B2 as to be rendered conductive only during the latter half of the trace or charge interval. Such operation of the tube V2' is conventional as is its circuit arrangement with the output transformer $T_0''$ which drives the horizontal winding $L_Y$ of a scanning yoke. A conventional boost diode V5 is provided between the energizing potential source +B and a conventional linearity control comprising an adjustable inductor L1 and shunt connected condensers C6 and C7, by which to supply anode current through the primary winding of the transformer $T_0''$ to the vacuum tube amplifier V2'. The boost diode V5 recovers the energy of the reactive load at the end of each retrace or discharge interval in a manner well known, the diode V5 being conductive during the initial half of the trace or charge interval as represented by theoretical curve M of Fig. 10 and the amplifier tube V2' being conductive as earlier mentioned during the latter half of this interval as indicated graphically by curve N thereby producing a current of linear saw-tooth wave form through the scanning yoke $L_Y$ as indicated by curve S. The operation of the portion of the wave form generator just described is conventional and well known.

Figure 10:
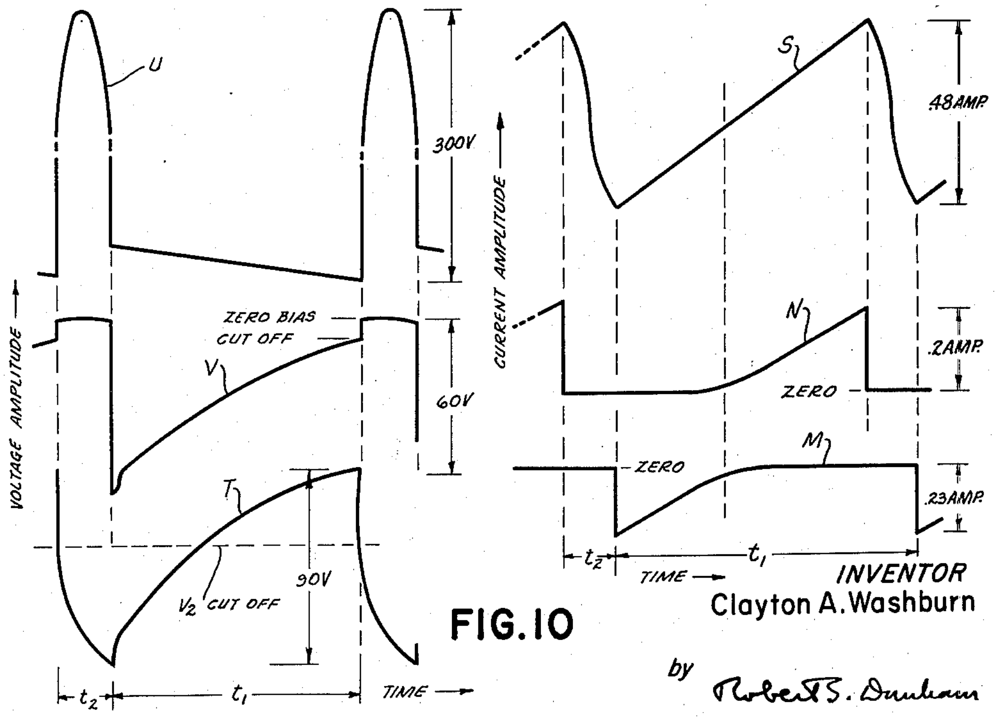

The amplifier tube V2' is supplied with a scanning voltage having a saw-tooth component represented by curve T of Fig. 10, and developed by a condenser $C_s$, and a pulse component developed across a series resistor $R_s$. The condenser $C_s$ charges through the resistor R*in*1 and the adjustable potentiometer P2 from the source of potential +B. As in the arrangements heretofore described, the discharge tube V1 periodically discharges the condenser $C_s$, but in this instance a regenerative feed-back voltage of pulse wave form represented by curve U of Fig. 10 is derived across a portion of the secondary winding of the output transformer $T_0''$ and is supplied to the control electrode of the tube V1 through the condensers C*r*1 and C*r*2 and resistor R*r*1. This feed-back voltage renders the system self-oscillatory at the frequency established by the value of a unidirectional bias applied to the control electrode of the tube V1 (which electrode has a composite applied voltage represented by curve V of Fig. 10) through the resistor R*c*1 the adjustable resistor P3', and the resistor R*c*3 from the adjustable tap of the potentiometer P2.

Phase synchronized operation of this oscillatory system is accomplished by an automatic frequency control tube V6 having a screen electrode which is supplied through a condenser C5 with the regenerative feed-back pulses and having a control electrode which is supplied with synchronizing pulses through a low pass filter network. The latter is comprised by series resistors $R_H'$—$R_H'''$ and shunt condensers $C_H'$—$C_H'''$, and has synchronizing pulses applied thereto from an input synchronizing signal amplitude-limiter stage $V_0$.

Figures 11, 12, 13:
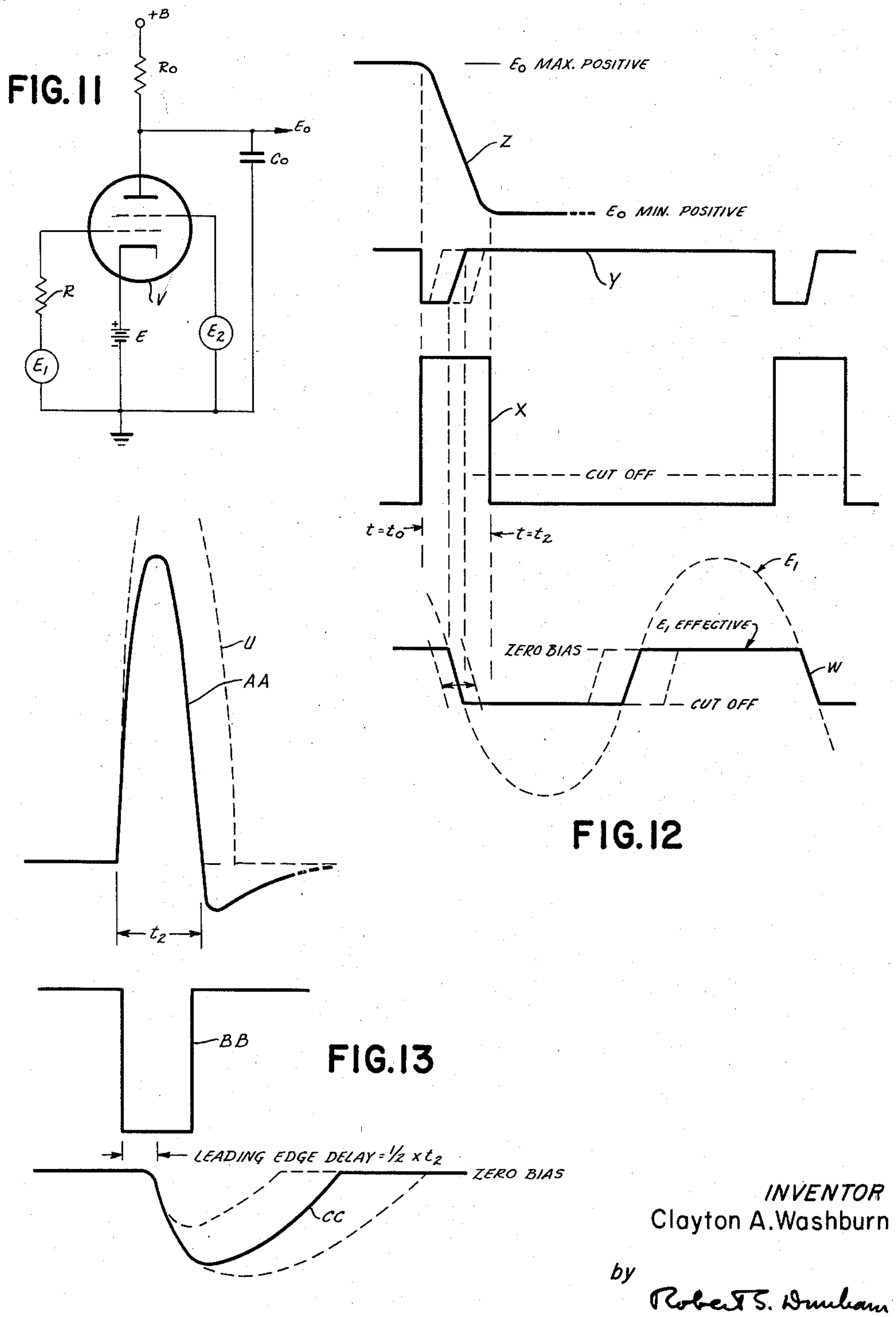
Fig. 11 is a simplified circuit arrangement.
Figs. 12 and 13 are graphs of voltage relationships, used as an aid in explaining the operation of the novel automatic frequency control system employed in the Fig. 9 wave form generator arrangement.

The operation of the automatic frequency control tube V6 will be considered by reference to its corresponding simplified electrical circuit of Fig. 11 and by use of the curves of Fig. 12. Fig. 11 shows a tube V having at least two control electrodes or grids and an anode energized through an anode load resistor $R_0$ from a source of potential +B and by-passed by a condenser $C_0$. This tube may be a double control grid type (such as a type 6SA7 pentagrid converter) or one with a suitable suppressor control characteristic or it may be a pentode or tetrode where sufficient voltage is supplied to drive the screen electrode as a control element. Fig. 12 graphically represents certain voltage relationships prevailing in effecting the control action of the control tube. Solid-line curve W represents an effective input-voltage amplitude wave form of an applied sinusoidal voltage $E_1$ which is to effect frequency control, and curve X represents the wave form of a voltage $E_2$ the frequency of which is to be controlled. In practice, either the voltage $E_1$ or $E_2$ may be the one the frequency or phase of which is to be controlled, and these voltages may be applied to either of the control electrodes of the tube V and with either positive or negative polarity as will become evident. The important characteristics of the voltage $E_2$ are that it shall have a sufficiently positive amplitude during a control interval $t_2$ and maintain a low voltage level (either constant or preferably below anode-current cut off value) during the remainder of the cycle. Although the voltage $E_2$ is shown as having a flat topped wave form, this is not essential and a wide range of wave forms may be employed. The wave form of the voltage $E_1$, while shown as sinusoidal, may vary over a wide range and include a rectangular wave form or a saw-tooth wave form.

It will be apparent that when the voltage $E_1$ is applied through an amplitude-limiting resistor R to one control electrode and the voltage $E_2$ is applied to the other control electrodes of the tube V, tube conduction occurs only at the beginning of the interval $t=t_0$ when the voltages $E_1$ and $E_2$ have concurrent positive amplitudes and conduction ceases when the voltage $E_1$ decreases in amplitude sufficiently to cause the tube V to become non-conductive. For the phase relationships of the voltages $E_1$ and $E_2$ shown, the resulting anode voltage of the tube V is represented by solid line curve Y. It will be apparent that as the phase of the voltage $E_1$ is shifted relative to that of the voltage $E_2$ from $t=t_0$ to $t=t_2$, the anode current pulses of the tube V become wider and the average anode voltage decreases as represented by curve Z. This anode voltage comprises the automatic frequency control voltage as will presently be more fully explained.

The phase control characteristic thus provided depends upon the relative wave shapes of the voltages $E_1$ and $E_2$, control interval $t_2$, and the control voltage versus frequency characteristic of the oscillator to be controlled. It will be noted that the voltage $E_1$ increase of positive slope at its zero intercept is of no consequence provided it does not occur so closely spaced in time with respect to the voltage decrease of negative slope which occurs during time $t_2$ as to limit the lock-in response speed versus control range required. While the conditions above discussed assume lock-in to occur on the negative slope of decreasing amplitude of the voltage $E_1$, this will depend of course on which voltage is to be controlled and the polarity required for the oscillator controlling voltage versus the frequency characteristic of the oscillator. A reversal of either would simply cause phase lock-in to occur on the increasing amplitude of positive slope of the voltage $E_1$. This automatic frequency or phase control system becomes a highly precise phase detector for a steep edged rectangular wave form, and in practice this rectangular wave form may be satisfactorily approximated by amplitude limiting of the sinusoidal wave form as indicated by the solid line curve W and by arranging for the phase comparison to occur in the region of the zero voltage intercept. Such amplitude limiting or clipping may often be performed by the action of the control electrode of the tube V itself, as by use of the series input resistor R of relatively large value to establish the upper limiting level by developing thereacross a large voltage drop whenever the control electrode of the tube V becomes conductive and by use of a suitable bias potential E to establish by anode-current cut off the lower amplitude limiting level.

The automatic frequency control arrangement above-described is of simple and flexible circuit arrangement, and possesses the ability to measure phase independently of other wave form characteristics to any desired degree of accuracy. It is particularly suitable for use with wave form generators of the type described above.

Considering now in further detail the operation of the automatic frequency control action of the Fig. 9 wave form generator, the automatic frequency control tube V6 is shown as a pentode. The regenerative feed-back pulse of the output transformer $T_0''$, and represented by curve U of Fig. 10, has more than adequate amplitude and power to drive the screen grid of the tube V6. Thus since a screen grid can be so used, there is no need for using a complex form of pentagrid converter type of tube thereby to eliminate the complexity and unreliability of such forms of multigrid tubes. The coupling condenser C5 and shunt resistor R5 enable control of the pulse amplitude and the automatic frequency control interval, represented as $t2$ in Fig. 12, independently of the oscillator circuit design considerations. As noted in connection with Fig. 11, the output control voltage of the tube V6 is of positive potential suitable readily to be applied by direct coupling through a suitable response control network (R*c*1, R*c*2, R*c*3, R*c*4 and R*c*5 and C*c*1, C*c*2) to the frequency control point (the junction of the resistor R*c*3 and potentiometer P3′) of the wave form generator. The energizing and bias potentials of the automatic frequency control tube V6 have magnitudes selected to provide the gain required for a particular application.

The wave form of the synchronizing signal supplied to the tube V6 may be derived from the composite sync portion of a video signal, where for example the generator is used as a horizontal scanning amplifier, but the sync signal wave form when so derived is not directly applicable but should be modified in a manner presently to be considered. The regenerative feed-back pulse of the output transformer $T_0''$ may be reduced in amplitude and shortened in duration compared to the control interval $t_2$ by the action of the coupling condenser C5 and resistor R5, as represented by solid-line curve AA of Fig. 13 which is shown by way of comparison in conjunction with the pulse wave form represented by broken-line curve U. This gives independent control of the automatic frequency control characteristic as previously mentioned. The synchronizing signal which is applied to the control tube V6 is graphically represented by curve BB of Fig. 13 and is modified by delaying its leading edge to coincide with the center of the regenerative feed-back pulse represented by curve AA. The synchronizing pulse is further modified by having its trailing edge "stretched" to prevent interference during the automatic frequency control interval range. Low frequency decoupling (differentiation) and restoring action prevent build up of the automatic frequency control potential during the vertical sync interval, since this would destroy the desired synchronous phase relationship between the synchronizing signal and the generator cyclic operation. The synchronizing pulse wave form modifications as last mentioned, and which are accomplished by the coupling network comprising the low pass filter elements $R_H'$—$R_H'''$ and $C_H'$—$C_H'''$ also provides the required delay mentioned just above. At the same time, this filter network transfers a relatively large amplitude input pulse to a lower amplitude "stretched" output pulse of wave form represented by curve CC of Fig. 13, and provides in addition a certain amount of filter action against high frequency sync signal noise components. The low frequency differentiation or decoupling may, for example, be provided by a series coupling condenser C7 interposed between the last two filter network sections and by including the filter network resistor $R_H'''$ in a voltage divider, comprising in addition a resistor $R_8$, and a grid resistor $R_6$, by which to apply a positive operating bias to the sync signal control electrode of the tube V6. The latter circuit portion also provides the desired restoring action to prevent build up of the automatic frequency control voltage during the vertical sync interval.

In practice the natural oscillatory frequency of the generator is established to be approximately the correct value by selection of the values of the resistor R*r*1, and condenser C*r*1. In particular, these components have values selected such that a charge of sufficient amplitude to provide frequency stability is stored in the condenser C*r*1 during the discharge or retrace interval, and the discharge tube V1 thus maintains its conductive state practically through the discharge interval in order to prevent too early conduction by the tube V2′ (which has a very large anode potential pulse applied to it by the output transformer $T_0''$ during the retrace interval and thus undesirably dissipates power if this tube is even slightly conductive). Actually the control of conduction of the tube V2′ is more precisely controlled by making the voltage drop across the resistor R*r*1 large compared to the charge required in C*r*1. As in the generators previously described, the charging interval $t_1$ is determined by the rate of discharge of the condenser C*r*1 through the resistor R*c*1. It will be noted that (as in the arrangement of Fig. 1) the control tube V6 not only controls the potential at the junction of the resistor R*c*3 and the potentiometer P3′ as previously mentioned, and by which to control the generator frequency and phase, but additionally may be coupled where necessary through the resistor R*in*2 by which to produce a corresponding change in the same sense of the anode voltage of the tube V1 and thereby maintain substantially constant the amplitude of the output generated voltage.

The wave form generator of Fig. 9 employs, as previously mentioned, a boost deflection circuit and conventional elementary wave forming concepts by which to form the saw-tooth component of the scanning voltage during the charge or trace interval. While such wave-forming methods are satisfactory over a limited range for noncritical applications, requirements for better performance while maintaining the boost circuit advantages are continually increasing. These requirements fall in general under the headings of linearity of wave form control, stability, output impedance control and the like. A typical problem encountered in the application of the boost circuit includes interaction of the high voltage load, when a high voltage of the order of 15 kv. or so is derived in conventional manner from the scanning system, with scanning deflection size and linearity. This becomes particularly serious in high-voltage low-deflection power applications such as in post acceleration color television receivers. In using the boost circuit, which has substantial advantages in power driving ability as compared to class A operated output scan amplifier applications, control of the diode conduction current is a major consideration in realization of optimum efficiency as well as linearity. Such control becomes particularly difficult in intermediate frequency applications (of the order of 5,000 cycles) or applications where the required pulse and saw-tooth components of the output scan voltage are of the same order of magnitude. The boost circuit has accordingly not been used in such applications as these. In the following described modifications of the present invention, the degenerative feed-back control of the generated wave form previously described in connection with class A operated output amplifiers is utilized in the boost type of deflection circuit to control the boost diode conduction while retaining the many other advantages inherent in this type of circuit. These modifications hereinafter described utilize this controlled boost type of circuit in conjunction with the self-oscillatory feature of the previously described modifications of the invention and in addition utilize auxiliary means for automatic control of the output generated voltage amplitude and wave form.

Complexity of the degenerative network configuration required to provide output wave form control in conjunction with proper control of the boost diode conduction depends upon the requirements of the output generated voltage wave form. Two general types of modifications embodying the invention will be hereinafter described: (1) those utilizing the output pulse in which the charging interval may be directly adjusted, by means of a degenerative wave forming section, to provide satisfactory control over the boost diode conduction; and (2) applications requiring a specific charge interval wave form (these may also utilize the output pulse) for which it will be shown that an auxiliary network in the boost diode circuit should be provided.

Figures 14, 15:
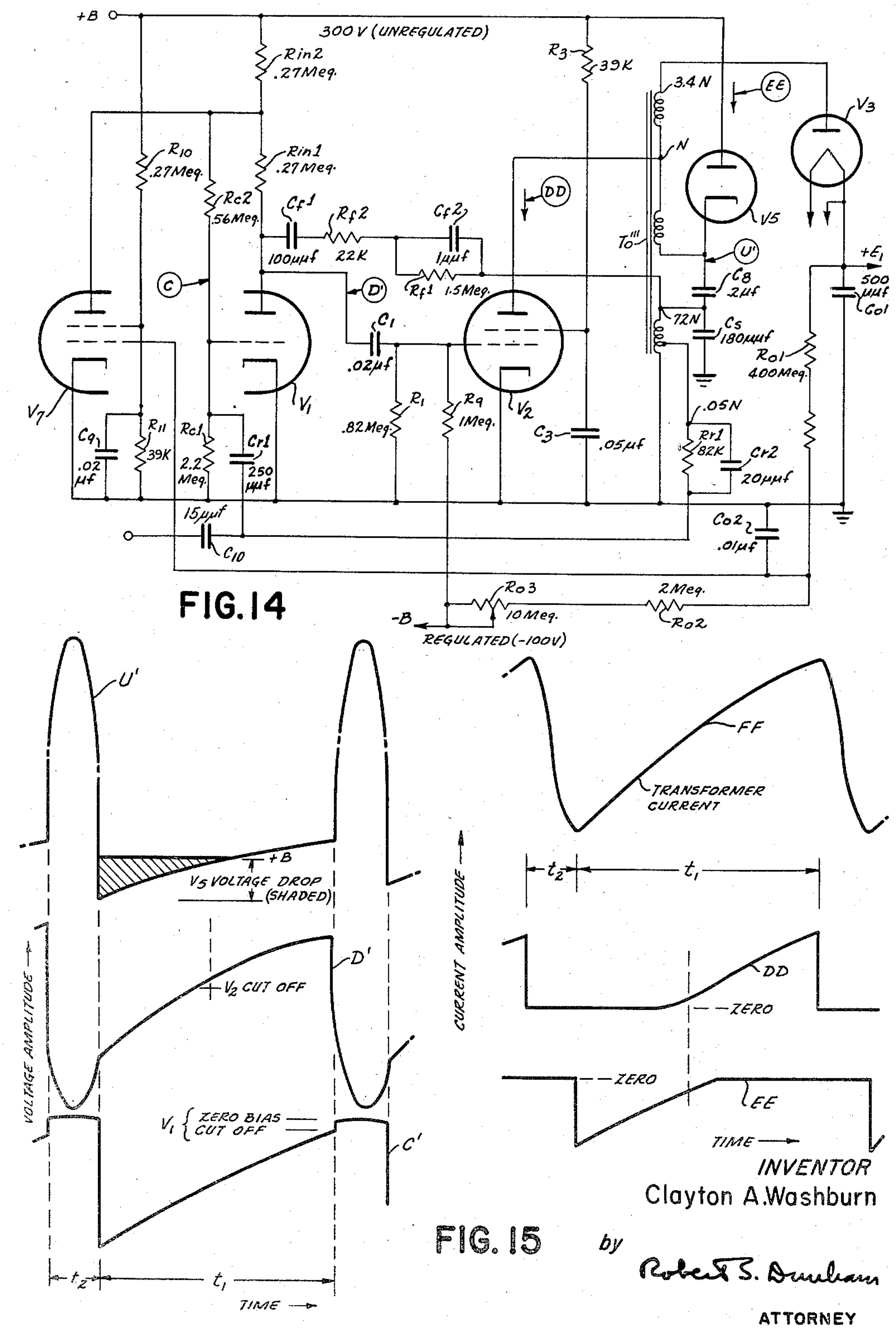
Fig. 14 is a circuit diagram representing yet a further modified form of the invention particularly suitable for generating a high unidirectional output potential of regulated amplitude, Fig. 15 graphically representing certain voltage and current relationships at specified points in the Fig. 14 arrangement and being used to explain its operation.

Fig. 14 is a circuit diagram representing a modified form of the invention suitable to provide a high unidirectional voltage of regulated amplitude. The wave form generator of the present arrangement is essentially similar to those previously described insofar as the functions of the tubes V1 and V2 are concerned, the condensers C*f*1 and C*f*2 and the resistors R*f*1 and R*f*2 providing a degenerative feed-back path from the output circuit of the tube V2 both to the output circuit of the tube V1 and also to the input circuit of the tube V2. As in the generator last described, a regenerative voltage of pulse wave form is supplied from the output transformer $T_0'''$ through the regenerative feed-back path comprised by the condensers C*r*1 and C*r*2 and the resistors R*r*1 and R*c*1 to the input circuit of the tube V1 to provide a self-oscillatory system. In this present arrangement, however, the amplifier tube V2 operates in the class C mode. The bias resistors R*c*1 and R*c*2 have values proportioned to provide essentially constant frequency of system operation, and controlled synchronization mode if desired may be effected by applying suitable synchronizing pulses through a condenser C10 to the input circuit of the tube V1.

A high voltage winding of the output transformer $T_0'''$ is applied to a diode rectifier V3 to develop across an output filter condenser $C_{01}$ a high unidirectional voltage substantially equal in magnitude to the peak pulse output voltage developed during the discharge or retrace interval. While the general operating characteristics of this oscillatory system are similar to that of Fig. 9 and the general requirements of the degenerative network (R*f*1, C*f*1, R*f*2 and C*f*2) are similar to those of Fig. 8, satisfactory operation of the present arrangement depends upon the following considerations. First, the basis for operation of a boost circuit depends upon a reactive load, normally provided by a deflection yoke inductive load, and the parallel stray or inherent capacitance of the yoke and associated circuitry. In the present arrangement the output transformer is designed to provide the required output inductance (much lower than normally used in deflection transformer applications), and additional parallel capacitance $C_s$ is provided. The values of the effective output inductance and parallel capacitance provided in a particular application depend upon the output power requirements, the desired operating frequency, and the duty ratio or ratio of charge to discharge intervals. Secondly, since the output voltage is now controlled during the charge interval by the degenerative feed-back network and there are no other requirements on the charge-interval portion of the generated output potential wave form, the wave forming degenerative network can be adjusted to provide optimum control of the conduction of the boost diode V5. The result is a circuit arrangement capable of low output impedance, high operating stability, and efficient operation over a wide range of unidirectional output voltage and current.

To illustrate the manner in which the conduction of the boost diode V5 is controlled in the present arrangement, wave forms of the output and boost diode voltages are graphically represented in Fig. 15. It will be noted that the feed-back network is adjusted to provide during the initial portion of the charge or trace interval $t_1$ a positive slope of the regenerative feed-back pulse voltage, represented by curve U', equal to the diode drop during the charge interval. Normally for a linear deflection generator (i.e., one having the wave forms represented in Fig. 10) this initial charge-interval slope of the feed-back voltage is required to be negative rather than positive. Its positive slope allows the boost diode V5 to conduct at the beginning of the charge or trace interval but prevents conduction during the latter part of this interval. Coincidentally the amplifier tube V2 is cut off at the beginning of the charge interval and becomes conductive during the latter part of this interval. Control of the slope of the feed-back voltage during the initial portion of the charge interval is obtained by proper selection of value of the degenerative feed-back network condenser C*f*1. Thus degenerative feed-back is utilized in the present arrangement to provide the inherent advantages of degeneration together with the advantages of boost circuit operation.

It is typical of sine wave oscillators, and in particular those capable of supplying a large power output, that control of output amplitude over a wide range is difficult and generally necessitates an equivalent control over the input power source (the direct current supply source, for instance) to accomplish. The wave form generators of the present invention can all be provided with a high impedance amplitude control point which may therefore readily be adapted to modulate or regulate the generated output voltage amplitude. Thus in the present arrangement a control tube V7 is provided and operates as a direct current amplifier to control the voltage at the junction of the resistors R*in*1 and R*in*2, thereby to control the amplitude of the generated output voltage, in response to a portion of the derived output unidirectional high voltage. To this end, a portion of the output high voltage is obtained through a voltage divider comprised by series resistors $R_{01}$, $R_{02}$ and adjustable resistor $R_{03}$, which are connected between the positive terminal of the output high voltage and a source of negative bias potential B− which also provides through a resistor R9 a suitable operating bias for the control electrode of the output amplifier tube V2. The portion of the output high voltage selected by the voltage divider last mentioned is filtered by a shunt condenser $C_{02}$ and is applied to the control electrode of the control tube V7. The latter operates to maintain the magnitude of the output unidirectional voltage substantially constant at a value determined by values selected for the voltage divider components $[(+E_1/R_{01})=-B/(R_{02}+R_{03})]$ so that the present arrangement achieves automatic output amplitude control or regulation.

Figures 16, 17:
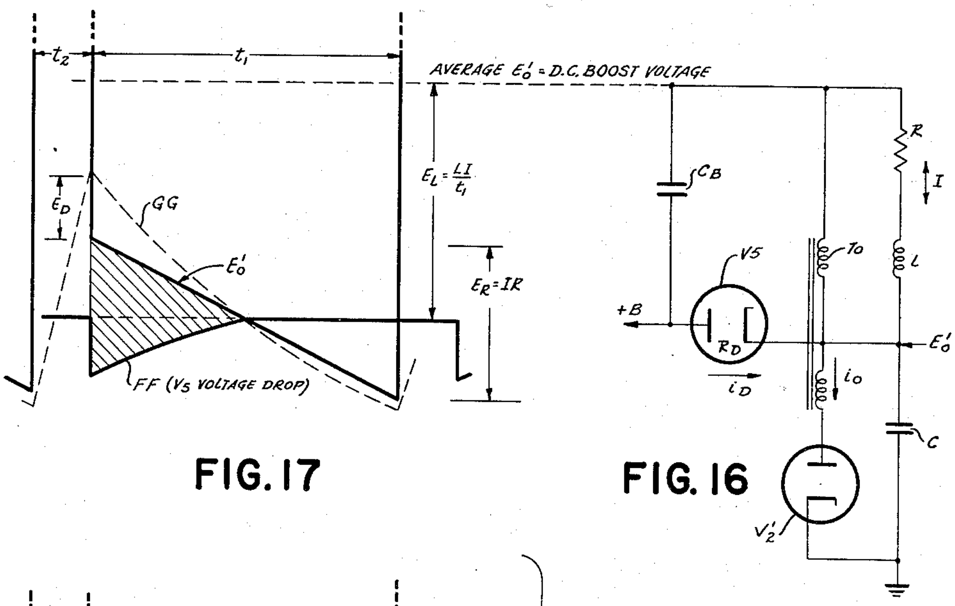
Figs. 16 and 17 are a simplified circuit, and a representation of the operating characteristics thereof, used in a general discussion of boost circuit characteristics.

Before considering a further described modified form of the invention, several characteristics of boost circuit operation are advantageously considered. In the conventional boost deflection circuit typified in Fig. 9, idealized output wave forms were assumed in order to illustrate its principal operating characteristics and to describe the wave form generator arrangement there shown. It is a generally realized fact that ideal operation is not inherent in such a boost circuit. The requirement for perfect linearity and optimum boost diode conduction are in fact exactly opposite. To illustrate this more clearly, Fig. 16 represents the equivalent output circuit portion of Fig. 9 drawn in order to show the relationship between the various circuit voltages. In Fig. 16, the equivalent values of yoke load and transformer reactances are referred to the cathode of the boost diode V5. Thus L is the total equivalent inductance and C the total effective capacity, and the transformer connections are shown to indicate the voltage and current relationships existing between the boost circuit components. Parallel circuit losses and transformer turns ratios are not considered in the present discussion since they do not concern the point to be made. Condenser $C_B$ replaces condensers C6 and C7 of Fig. 9 and is a by-pass condenser assumed to have a capacitance sufficiently large that no appreciable alternating voltage (for purposes of this discussion) appears at point 1. The latter point is, however, the average value of the load terminal voltage commonly referred to as the boost voltage. Under the assumption that boost diode current flows during the approximate first half of the charge of trace interval, the required voltage of the boost diode V5 is represented in Fig. 17 as wave form FF and has the value $i_dR_d$. This is the same as was indicated for the Fig. 14 arrangement by the wave form U' of Fig. 15 during the initial portion of the charge or trace interval. If a linear deflection current I is assumed, then during the charge interval the voltage $$E_0'=Ldi/dt+IR=-LI/t_1+IR$$

(relative to its [$E_0'$] wave form average value or boost voltage at point 1) and comprises a pulse component of voltage and a saw-tooth component equal to IR. This is shown in proper voltage relationship in Fig. 16 as the wave form $E_0'$. It will now be observed that to specify the linearity requirement the cathode of the boost diode V5 if connected directly to the output circuit would be above +B voltage and could not conduct until the second half of the charge or trace interval. Such operation, of course, prevents boost circuit operation. Accordingly, the differential voltage represented by the shaded area of Fig. 17 that must be supplied to the boost circuit to provide the specified operation is equal to $-I(R+Rd)$. The broken line curve GG shows the voltage wave form which would have to be supplied to the anode of the boost diode V5 to meet this requirement.

Satisfactory operation in typical horizontal deflection circuits is achieved by making allowance for sufficient nonlinearity, and/or excessive diode conduction (which is then used to provide power for other uses) and/or by providing an approximation of the differential voltage represented by the curve GG. The linearity control components shown in Fig. 9 and comprised by the inductor L1 and condensers C6 and C7 represents such typical approximation. Successful application of these methods is limited to an operating region in which the resistive voltage component is small compared to the inductive component, to applications where output impedance is not critical, and to applications where linearity and linearity control is not critical.

Figure 18:
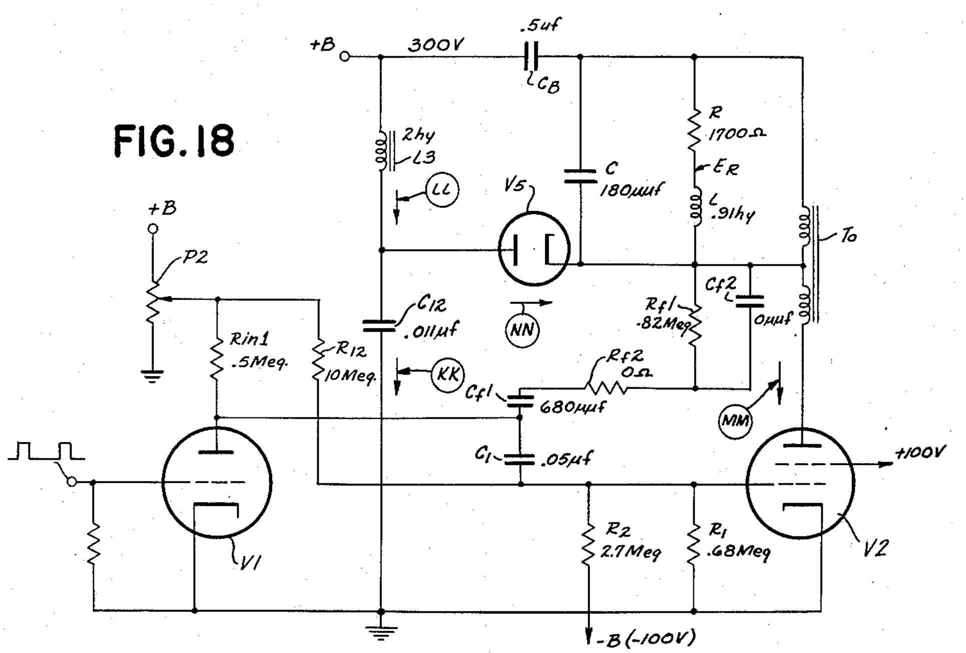
Fig. 18 represents a further modification of the invention embodying a particular form of the invention utilizing a boost circuit, and Fig. 19 graphically represents certain voltage relationships prevailing during operation of this embodiment.
Figure 20:
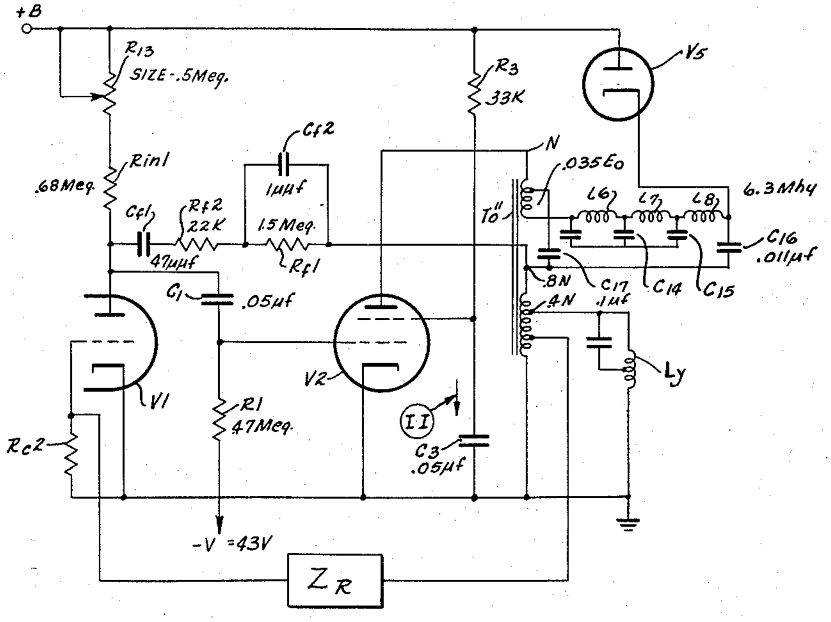
Fig. 20 is a circuit diagram representing a further modified form of the invention utilizing a boost circuit.

Figs. 18 and 20 represent modified forms of the invention which avoid all of the difficulties last mentioned in connection with boost circuit design and operation.

Figure 19:
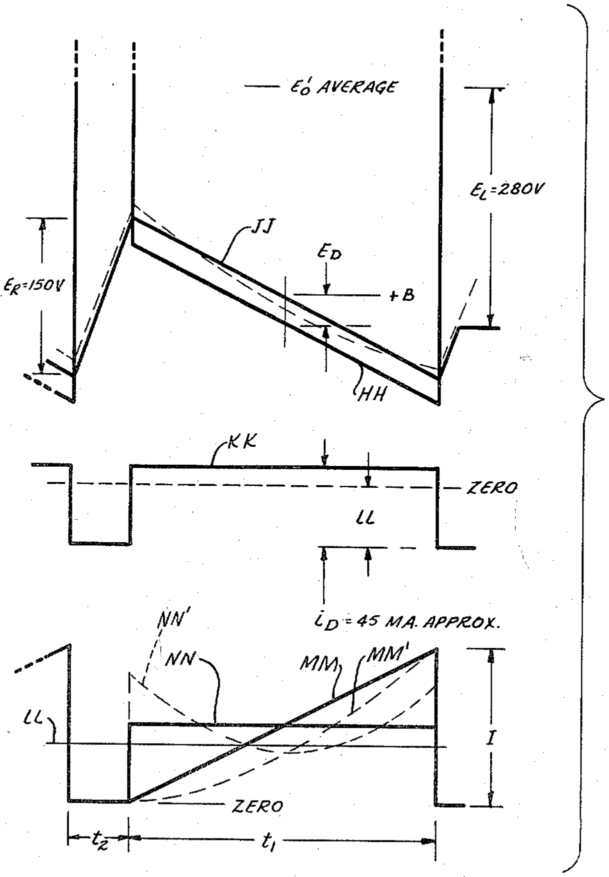

The arrangement of Fig. 18 provides boost operation over the range in which the pulse component $E_L$ of the generated output voltage is of the same order of magnitude as the saw-tooth component $E_R$. Typical applications in which the present arrangement has high utility include those wherein the frequency of operation is somewhere within the range between the conventional vertical scanning frequency and the conventional horizontal scanning frequency employed in conventional television scanning systems. The present arrangement may be considered a class A type of boost circuit since the output amplifier V2 and the boost diode V5 conduct during the entire charge or trace interval. This modified form of the invention differs from a conventional boost circuit in that (1) a degenerative wave forming impedance network ($Rf1$, $Cf1$, $Rf2$ and $Cf2$) is used to control the output wave form during the charge or trace interval in the manner previously described, and (2) a bias adjusting resistor R12 and a network L3 C12 has been added to control the conduction of the boost diode V5. It will be noted that while the degenerative wave forming impedance network is shown in Fig. 18 as being connected by way of example to the cathode of the diode V5, this impedance network in modified form may also be connected to the anode of the latter diode. A linear output wave form, represented by curve HH of Fig. 19 (and in which $E_0'=E_L+E_R$), is assumed and the voltage at the anode of the boost diode V5, represented by curve JJ of Fig. 19, is supplied by the inductor L3 and condenser C12. This action will now be considered in greater detail.

If a sufficiently large value of inductance of the inductor L3 is assumed, its current represented graphically by curve LL will be constant and equal to the average value of current drawn by the output amplifier tube V2. The wave forms graphically shown in Fig. 19 are all shown as equivalent values referred to the cathode point of the boost diode V5. During the discharge or retrace interval $t_2$ when the boost diode V5 is nonconducting, the current represented by curve LL through the inductor L3 is equal to the current represented by curve KK through the condenser C12 and the charge voltage represented by curve JJ developed across the condenser C12 will have a peak-to-peak value given by the relation $i_{L3}t_2/C_{12}$, where $i_{L3}$=the instantaneous current through the inductor L3. In order that this voltage provide the desired current $i_{V5}$ wave form (represented by curve NN) through the diode V5 it must equal the load resistive voltage drop $E_R$. Therefore:

$$IR=\frac{i_{L3}t_2}{C_{12}} \quad (1)$$

also $$i_{L3}t_2=i_{C12}t_1 \quad (2)$$

where $i_{C12}$=instantaneous value of current through the condenser C12 during the interval $t_1$ and $$i_{V5}=i_{L3}+i_{C12}=i_{L3}+i_{L3}t_2/t_1=i_{C12}/\text{duty ratio} \quad (3)$$

The instantaneous anode current of the amplifier tube V2 (represented by curve MM) is $ip=I+i_{V5}$, the average value of anode current being $I/2\times$duty ratio (which is $t_1/t_2$)$=i_{L3}$; therefore Equation 1 has the valve:

$$IR=\frac{t_2I\times\text{duty ratio}}{2C_{12}} \quad (4)$$

therefore, $$t_2=\frac{2RC_{12}}{\text{duty ratio}} \quad (5)$$

but since the interval $2t_2=\sqrt{L_3C_{12}}$ (which is the discharge or retrace frequency), Equation 5 may be written in the form:

$$C_{12}=\sqrt{L_3C_{12}}\times\text{duty ratio}/2R$$

which is independent of the output amplitude provided that the average value of anode current of the amplifier tube V2 is maintained proportional to the load current I. This is accomplished for variable amplitude by connecting a suitable resistor R12 to the adjustable tap of the size control potentiometer P2 as shown or alternatively to the boost voltage (the right hand terminal of condenser $C_B$) by which to provide the control electrode operating bias of the amplifier tube V2. Circuit adjustments in this regard are not critical since the degenerative wave forming impedance network will correct discrepancies over a relatively wide range.

It was assumed in the foregoing discussion that the value of the inductor L3 was so large as to maintain the inductor current $I_{L3}$ constant. This conduction is not essential and in practice the value of the inductor L3 may be reduced approximately to a value such that $i_{L3}$ (an amplitude versus time variation of parabolic wave form) $=I/2$, which obtains when $L3=Rt_1/4$. Fig. 19 shows in broken lines the current wave forms for the latter operating conditions, and it will be observed that the output current has a parabolic wave form during the trace interval with the average valve ⅓ $I\times$duty ratio instead of ½ as previously required.

While the present modification of the invention does not have the current efficiency ($I/8$) of the idealized boost diode operation previously described, it is a practical form of arrangement easily adaptable to applications involving intermediate frequencies of the order of 5,000 cycles per second.

An additional modified form of the invention is shown in Fig. 20, and is one which achieves theoretically ideal operation of the boost circuit. This arrangement is essentially similar to that of Fig. 18 except that the inductor L3 and condenser C12 have been replaced for example by a negative impedance network comprised by series inductors L6, L7 and L8, etc. of which inductors L6 and L7 have respective condensers C14 and C15 connected across them as shown and with a condenser C16 terminating the network at one end and a condenser C17 terminating the network at the other end through a tap on the output transformer $T_0''$ as shown and by which to supply a small percentage of output voltage through the network to the boost diode V5. This network is shown in a preferred position coupling the output amplifier V2 and the boost diode V5 with the output load, comprised by a scanning winding. It may however, be located at any position in the circuit of the boost diode V5 and may assume a variety of circuit configurations depending upon the simplicity, accuracy, and wave form requirements to be met. The network in general will involve a combination of LC resonant circuits actuated by any of a variety of combinations of available circuit voltages and/or currents. For the component values shown in the drawing, the linearity is approximately within plus or minus ½ percent. The several network sections are adjusted to provide the first several harmonics of the differential voltage required as represented by curve GG of Fig. 17 $[-I(R+R_d)]$. The degenerative feed-back network may be adjusted to provide conventional class C operation of the output amplifier V2 or to approach the mode of operation described in connection with Fig. 18. In the latter instance the anode current of the output amplifier V2 is held at a low value during the first half of the charging period, thus approaching optimum efficiency, but maintains control of the output voltage and current wave form over the complete charge or trace cycle and thus may be used to control its instantaneous slope. The arrangement of Fig. 20 is shown as of the self-oscillatory type by use of a regenerative feed-back network $Z_R$ in the manner of Fig. 9 previously described.

While specific forms of the invention have been described for purposes of illustration, it is contemplated that numerous changes may be made without departing from the spirit of the invention.

What is claimed is:

1. A wave-form generator comprising, control potential generating means including a source of unidirectional potential and an impedance energized thereby for generating a control potential of desired wave-form, amplifying means controlled by the control potential developed by said first-named means for developing an output potential of preselected wave form to energize a load, conductance control means coupled to said control potential generating means and having a conductance control element for causing said conductance control means to have a nonconductive state permitting said potential generating means to store energy and a relatively low-impedance state effective to discharge energy from said potential generating means, and means including a time-constant circuit energized in response to said output potential for regeneratively controlling the initiation of the conductive state of said last-named means to initiate each of repetitive cycles of operation thereof, said time-constant circuit including at least one feed-back current-control element and at least one feed-back energy-storage element through which said output potential is applied to said control element and said last-mentioned elements having values proportioned to control the conductive state interval of said conductance control means in accordance with a predetermined duration and wave-form of a first portion of said output potential and to enable the independent control of the nonconductive state interval of said conductance control means in accordance with a desired duration of a second portion of said output potential.

2. A wave-form generator comprising, control potential generating means including a time-constant circuit having a network formed of capacitive and resistive elements coupled to a source of unidirectional potential for effecting charge of said capacitive elements, means controlled by the charge potential developed across at least one of said capacitive elements for developing an output potential having during a substantial portion of a relatively long trace interval a wave-form portion of wave shape controlled substantially entirely by the time constant characteristics of said network, conductance control means coupled to said one capacitive element and having a conductance control element for causing said conductance control means to have a nonconductive state permitting said one capacitive element to charge and a relatively low-impedance state effective to discharge said one capacitive element, and means including a time-constant circuit energized in response to said output potential for regeneratively controlling the initiation of the conductive state of said last-named means to initiate each of repetitive cycles of operation thereof said time-constant circuit including at least one feed back current-control element and at least one feed-back energy-storage element through which said output potential is applied to said control element and said last-mentioned elements having values proportioned to control the conductive state interval of said conductance control means in accordance with a predetermined duration and wave-form of a first portion of said output potential and to enable the independent control of the nonconductive state interval of said conductance control means in accordance with a desired duration of a second portion of said output potential.

3. A wave-form generator comprising, amplifying means having input and output circuits and including a condenser in a feed-back path degeneratively coupling said circuits and charged through a resistor from a unidirectional potential source, said amplifying means being biased to be responsive to the charge potential of said condenser only during a terminal portion of each trace interval to energize an inductive load with a current of saw-tooth wave form, means including a conductive device coupled to said inductive load and responsive to the stored energy therein for controlling the dissipation of energy in said inductive load during an initial portion of said each trace interval, conductance control means coupled to said condenser to permit charge and to effect rapid discharge thereof, and means including a time constant circuit energized in response to the output potential of said amplifying means for regeneratively controlling said last-named means to initiate each of repetitive cycles of operation thereof and thereby effect generation of a periodic energizing potential for said inductive load.

4. A wave-form generator comprising, amplifying means having input and output circuits and including a condenser in a feed-back path degeneratively coupling said circuits and charged through a resistor from a unidirectional potential source, said amplifying means being biased to be responsive to the charge potential of said condenser only during a terminal portion of each trace interval to energize an inductive load with a current of saw-tooth wave form, means including a conductive device coupled to said inductive load and responsive to the stored energy therein for controlling the dissipation of energy in said inductive load during an initial portion of said each trace interval, conductance control means coupled to said condenser to permit charge and to effect rapid discharge thereof, means including a time constant circuit energized in response to the output potential of said amplifying means for regeneratively controlling said last-named means to initiate each of repetitive cycles of operation thereof and thereby effect generation of a periodic energizing potential for said inductive load, and means responsive to said stored energy of said load for developing during each retrace interval a unidirectional potential and for utilizing said developed potential to maintain the amplitude of said generated output potential substantially constant by control of the magnitude of the potential of said source.

5. A wave-form generator comprising, amplifying means having input and output circuits and including a condenser in a feed-back path degeneratively coupling said circuits and charged through a resistor from a unidirectional potential source, said amplifying means being biased to be responsive to the charge potential of said condenser only during a terminal portion of each trace interval to energize an inductive load with a current of saw-tooth wave form, means including a conductive device coupled to said inductive load and responsive to the stored energy therein for energizing said inductive load during an initial portion of said each trace interval, conductance control means coupled to said condenser to permit charge and to effect rapid discharge thereof, and means including a time constant circuit energized by a potential of pulse wave form developed in said load for regeneratively controlling said last-named means to initiate each of repetitive cycles of operation thereof and thereby effect generation of a periodic energizing potential for said inductive load.

6. A wave-form generator comprising, generating means including a series condenser and resistor coupled to a source of unidirectional potential and a controllable discharge device having output electrodes coupled across said condenser for developing a periodic charge voltage of saw-tooth wave form across said condenser and a periodic output voltage of preselected wave form to energize an inductive load, means for concurrently applying to input and output electrodes of said controllable discharge device operating biases of adjustable values and of proportioned magnitudes to control by control of the value of one operating bias the magnitude of said generated voltage while maintaining substantially constant the periodicity of said generated voltage, and means responsive to the stored energy of said load for developing during a discharge interval of said condenser a unidirectional potential and for utilizing said developed potential to maintain the amplitude of said generated voltage substantially constant by control of the magnitude of said one operating bias.

7. A wave-form generator comprising, means including a series condenser and resistor coupled to a source of unidirectional potential for effecting charge of said condenser, amplifying means for developing an output potential of preselected saw-tooth wave form and including input and output circuits having said condenser in a feed-back path degeneratively coupling said circuits, conductance control means coupled to said condenser and having a nonconductive state permitting said condenser to charge and having a conductive state effective rapidly to discharge said condenser, and means including a current-limiting regenerative feed-back time-constant circuit for utilizing the output potential of said amplifying means regeneratively to control the initiation of the conductive state of said control means to initiate each of repetitive cycles of operation thereof and thereby effect generation in said output circuit of a periodic output potential having during each cycle thereof said saw-tooth wave form.

8. A wave-form generator comprising, means including a series condenser and resistor coupled to a source of unidirectional potential for effecting charge of said condenser, a pair of tandem connected transconductance controlled devices having input and output circuits and including said condenser in a feed-back path degeneratively coupling the input and output circuits of one of said devices and degeneratively coupling the output circuit of said one device and the output circuit of the other of said devices, and a feed-back current limiting time-constant regenerative feed-back path for regeneratively coupling the output circuit of said one device with the input circuit of said other device to provide a self-oscillatory system effective to develop an output potential having a first wave form portion of wave shape controlled substantially by the electrical characteristics of said degenerative feed-back path and having a second wave form portion of wave shape controlled substantially by the electrical characteristics of said current-limiting regenerative feed-back path.

9. A wave-form generator comprising, means including a network having plural condenser-resistor sections coupled to a source of unidirectional potential for effecting charge of at least one condenser, a pair of tandem connected transconductance controlled devices having input and output circuits and including said one condenser in a feed-back path degeneratively coupling the input and output circuits of one of said devices and degeneratively coupling the output circuit of said one device and the output circuit of the other of said devices, and a feed-back current limiting time constant regenerative feed-back path for regeneratively coupling the output circuit of said one device with the input circuit of said other device to provide a self-oscillatory system effective to develop a periodic output potential, said network sections having related time constants each contributing to control of the wave form of said output potential during a charge interval of said one condenser and said current-limiting regenerative feed-back path controlling the wave form of said output potential during the discharge interval of said one condenser.

10. A wave-form generator comprising, means including a series condenser and resistor coupled to a source of unidirectional potential for effecting charge of said condenser, a pair of tandem connected transconductance controlled devices having input and output circuits and including said condenser in a feed-back path degeneratively coupling the input and output circuits of one of said devices and degeneratively coupling the output circuit of said one device and the output circuit of the other of said devices, said one repeater device having operating potentials applied thereto to effect operation thereof as a class A amplifier and said other repeater device having operating potentials applied thereto to effect operation thereof as a class C amplifier, and a time-constant regenerative feed-back path for regeneratively coupling the output circuit of said one device with the input circuit of said other device to provide a self-oscillatory system effective to develop an output potential having a first wave form portion of wave shape controlled substantially by the electrical characteristics of said degenerative feed-back path and having a second wave form portion of wave shape controlled substantially by the electrical characteristics of said regenerative feed-back path.

11. A wave-form generator comprising, means including a series condenser and resistor coupled to a source of unidirectional potential for effecting charge of said condenser, a pair of tandem connected transconductance controlled devices having one device energized from said potential through an output circuit load resistor and having the other of said devices energized through said first mentioned resistor and having said condenser included in a feed-back path degeneratively coupled between the low potential terminals of said resistors, and a feed-back current limiting time-constant feed-back for regeneratively coupling the output circuit of said one device with the input circuit of said other device to provide a self-oscillatory system effective to develop an output potential having a first wave form portion of wave shape controlled substantially by the electrical characteristics of said degenerative feed-back path and having a second wave form portion of wave shape controlled substantially by the electrical characteristics of said current limiting regenerative feed-back path.

12. A wave-form generator comprising, means including a series condenser and resistor coupled to a source of unidirectional potential for effecting charge of said condenser, a pair of tandem connected transconductance controlled devices having one device energized from said potential through an output circuit load resistor and having the other device energized through said first mentioned resistor and having said condenser included in a degenerative feed-back path degeneratively coupled between the low potential terminals of said resistors, a time-constant regenerative feed-back path regeneratively coupling the output circuit of said one device with the input circuit of said other device to provide a self-oscillatory system effective to develop an output potential having a first wave form portion of wave shape controlled substantially by the electrical characteristics of said degenerative feed-back path and having a second wave form portion of wave shape controlled substantially by the electrical characteristics of said regenerative feed-back path, and means for concurrently applying to the input circuit and output circuit of said other device operating potentials of adjustable values and of proportionate magnitudes to control by control of the value of said input-circuit potential the periodicity of said output potential while maintaining substantially constant the amplitude of said output potential.

13. A wave-form generator comprising, means including a series condenser and resistor coupled to a source of unidirectional potential for effecting charge of said condenser, a pair of tandem connected transconductance controlled devices having one device energized from said potential through an output circuit load resistor and having the other device energized through said first mentioned resistor and having said condenser included in a degenerative feed-back path degeneratively coupled between the low potential terminals of said resistors, a feed-back current limiting time-constant regenerative feed-back path for regeneratively coupling the output circuit of said one device with the input circuit of said other device to provide a self-oscillatory system effective to develop an output potential having a first wave form portion of wave shape controlled substantially by the electrical characteristics of said degenerative feed-back path and having a second wave form portion of wave shape controlled substantially by the electrical characteristics of said current limiting regenerative feed-back path, and means for varying the value of the unidirectional potential applied through said first mentioned resistor to vary the amplitude of said output potential and for concurrently varying in the same sense the value of an input circuit potential of said other stage to maintain substantially constant the periodicity of said output potential.

14. A wave-form generator comprising, means including a series condenser and resistor coupled to a source of unidirectional potential for effecting charge of said condenser, amplifying means for developing an output potential of preselected saw-tooth wave form and including input and output circuits having said condenser in a feed-back path degeneratively coupling said input and output circuits degeneratively to control the amplification characteristic of said amplifying means, the amplitude of the charge potential of said condenser and the operating bias of said amplifying means being selected to render said amplifying means quiescent during an initial portion of each trace interval and said amplifying means during the remainder of said trace interval developing an output potential of preselected wave form to energize an inductive load, means including a conductive device coupled to said inductive load and responsive to the energy therein for controlling the dissipation of energy in said inductive load during said initial portion of said each trace interval, conductance control means coupled to said condenser and having a nonconductive state permitting said condenser to charge and a relatively low-impedance state effective rapidly to discharge said condenser, and means including a time-constant circuit energized in response to said output potential for regeneratively controlling the initiation of the conductive state of said last-named means to initiate each of repetitive cycles of operation thereof and thereby effect generation of a periodic output potential having during each cycle thereof a saw-tooth wave-form portion.

15. A wave-form generator comprising, means including a series condenser and resistor coupled to a source of unidirectional potential for effecting charge of said condenser, amplifying means for developing an output potential of preselected saw-tooth wave form and including input and output circuits having said condenser in a feed-back path degeneratively coupling said input and output circuits degeneratively to control an amplification characteristic of said amplifying means, the amplitude of the charge potential of said condenser and the operating bias of said amplifying means being selected to render said amplifying means quiescent during an initial portion of each trace interval and said amplifying means during the remainder of said trace interval developing an output potential of preselected wave form to energize an inductive load, means including a conductive device coupled to said inductive load and responsive to the energy therein for controlling the dissipation of energy in said inductive load during said initial portion of said each trace interval, and conductance control means coupled to said condenser and having a nonconductive state permitting said condenser to charge and a relatively low-impedance state effective rapidly to discharge said condenser.

16. A wave-form generator comprising, means including a series condenser and resistor coupled to a source of unidirectional potential for effecting by periodic charge and discharge of said condenser the development of a voltage of saw-tooth wave form, amplifying means biased to operate essentially in a class A mode and being responsive to said developed voltage to energize an inductive load with a current of saw-tooth wave form, and means responsive to the stored energy of said load for developing during each retrace interval a high unidirectional potential and for utilizing a proportionate part of said developed potential to maintain the amplitude of said generated output potential substantially constant by control of the magnitude of the potential of said source.

17. A synchronized wave-form generator comprising, generating means including a series condenser and resistor coupled to a source of unidirectional potential and a controllable discharge device having output electrodes coupled across said condenser for developing thereacross a periodic charge voltage of saw-tooth wave form and a periodic output voltage of preselected wave form synchronous with said charge voltage, means providing a feed-back current limited feed-back circuit for utilizing said output voltage to render said generative means self-oscillatory, said discharge device having a unidirectional potential of adjustable value applied to a conductance control electrode thereof to control by adjustment of the value thereof the periodicity of said output voltage, and means responsive to the relative phase of a synchronizing voltage and said output voltage for adjusting the value of said unidirectional potential applied to said conductance control electrode to maintain said output voltage in phase synchronism with said synchronizing voltage.

18. A synchronized wave-form generator comprising, generating means including a series condenser and resistor coupled to a source of unidirectional potential and a controllable discharge device having output electrodes coupled across said condenser for developing thereacross a periodic charge voltage of saw-tooth wave form and a periodic output voltage of preselected wave form synchronous with said charge voltage, a resistive potential divider including a resistive element coupled to a source of unidirectional potential for applying to a conductance control electrode of said device a bias potential effective to control the periodicity of said output voltage, and a plural control-electrode conductive device energized from a unidirectional potential source through said resistive element and responsive to the relative phase of a synchronizing voltage of essential pulse wave form applied to one control electrode thereof and a second voltage of essential pulse wave form synchronous with said output voltage and applied to said other control electrode thereof for controlling the value of said bias potential to maintain said output voltage in phase synchronism with said synchronizing voltage.

19. A synchronized wave-form generator comprising, generating means including a series condenser and resistor coupled to a source of unidirectional potential and a controllable discharge device having output electrodes coupled across said condenser for developing thereacross a periodic charge voltage of saw-tooth wave form and a periodic output voltage of preselected wave form synchronous with said charge voltage, said discharge device having unidirectional potentials of adjustable values and of proportionate magnitudes applied to conductance-control and output electrodes thereof to control by adjustment of the values thereof the periodicity of said output voltage while maintaining substantially constant the amplitude thereof, and means responsive to the relative phase of a synchronizing voltage and said output voltage for concurrently adjusting in the same sense the values of said unidirectional potentials applied to said discharge device to maintain said output voltage in phase synchronism with said synchronizing voltage.

20. A synchronized wave-form generator comprising, generating means including a series condenser and resistor coupled to a source of unidirectional potential and a controllable discharge device having output electrodes coupled across said condenser for developing thereacross a periodic charge voltage of saw-tooth wave form and a periodic output voltage of preselected wave form synchronous with said charge voltage, a resistive potential divider including a resistive element coupled to a source of unidirectional potential for applying to a conductance control electrode of said discharge device a bias potential effective to control the periodicity of said output voltage, and a plural control-electrode conductive device energized through said resistive element and included in a potential divider establishing the value of a unidirectional potential applied to an output electrode of said discharge device for controlling in response to the relative phase of a synchronizing voltage applied to one control electrode thereof and a second voltage synchronous with said output voltage and applied to another control electrode thereof the proportionate values of said potentials applied to said discharge device to maintain said output voltage in phase synchronism with said synchronizing voltage while maintaining substantially constant the amplitude of said output voltage.

21. A wave-form generator comprising, conductance control means having input and output circuits, energy storage means having at least one time-constant circuit and providing regenerative coupling between said output and input circuits to render said conductance control means with its input and output circuits self-oscillatory, said conductance control means during each cycle of said oscillations providing two controllable operating conditions in one of which energy may be stored by said time-constant circuit of said energy storage means and in the other of which any energy stored by said time-constant circuit is dissipated, feed-back current control means for controlling said other condition of said conductance control means to control the interval of said energy dissipation and thereby the period of a cycle of operation of said generator.

22. A wave-form generator comprising, conductance control means having input and output circuits, energy storage means having at least one time-constant circuit and providing regenerative coupling between said output and input circuits to render said conductance control means with its input and output circuits self-oscillatory, said conductance control means during each cycle of said oscillations providing two controllable operating conditions in one of which energy may be stored by said time-constant circuit of said energy storage means and in the other of which any energy stored by said time-constant circuit is dissipated, and means for controlling the feed-back regenerative current and at least one steady-state operating potential bias of said conductance control means to control by control of said other condition thereof the interval of each energy dissipation and thereby the period of each cycle of operation of said generator.

23. A wave-form generator comprising, conductance control means having input and output circuits and including a conductance control device having input and output electrodes, energy storage means having at least one time-constant circuit and providing regenerative coupling between said output and input circuits to render said conductance control means with its input and output circuits self-oscillatory, said conductance control means during each cycle of said oscillations providing two controllable operating conditions in one of which energy may be stored by said time-constant circuit of said energy storage means and in the other of which any energy stored by said time-constant circuit is dissipated, and means for controlling the feed-back regenerative current and for controlling concurrently the magnitudes of steady-state operating potentials applied to the electrodes of said device to control by control of said other condition of said conductance control means the interval of said energy dissipation and thereby the period of cyclic operation of said generator.

24. A wave-form generator comprising, conductance control means having input and output circuits and including a conductance control device having input and output electrodes, means for regeneratively coupling said input and output circuits to render said conductance control means self-oscillatory and including energy storage means and feed-back current control means which together have a time-constant providing primary control over the frequency of oscillation, said conductance control means during each cycle of said oscillations providing two controllable operating conditions in one of which energy may be stored by said energy storage means and in the other of which any energy stored by said energy storage means is dissipated, and means for controlling concurrently the magnitudes of steady-state operating potentials applied to said electrodes of said device to control by control of said other condition of said conductance control means the rate of said energy dissipation and thereby provide a secondary control over the frequency of oscillation.

25. A wave-form generator comprising, conductance control means having input and output circuits, energy storage means providing at least one time-constant circuit and also providing distinct from said time-constant circuit a feed-back current limited regenerative coupling circuit between said output and input circuits of said conductance control means to render said conductance control means with its input and output circuits self-oscillatory, said conductance control means during each cycle of said oscillations providing two controllable operating conditions in one of which energy may be stored by said time-constant circuit and in the other of which any energy stored by said time-constant circuit is dissipated, means for controlling said other condition of said conductance control means to control the rate of said energy dissipation and thereby the period of a cycle of operation of said generator, and means for applying a synchronizing signal to said regenerative coupling circuit to synchronize the cyclic operation of said generator.

26. A wave-form generator comprising, conductance control means having an input circuit and an output circuit including an inductive impedance to be energized, energy storage means having a first time-constant circuit for control of the wave form of the energizing current supplied to said impedance during a portion of each operating cycle and having a second feed-back current limiting time-constant circuit regeneratively coupling a pulse voltage from said impedance to said input circuit to render said conductive control means self-oscillatory at a cyclic periodicity primarily controlled by said second time-constant circuit, said conductance control means during each cycle of said oscillations providing two controllable operating conditions in one of which energy may be stored by said first time-constant circuit and in the other of which any energy stored by said first time-constant circuit is dissipated, and phase control means responsive jointly to said regenerative pulse voltage and to a synchronizing voltage of pulse wave form for controlling at least one steady-state operating potential bias of said conductance control means to control by said other condition thereof the rate of said energy dissipation and thereby provide a secondary phase control over the cyclic periodicity of oscillation.

27. A wave-form generator comprising, conductance control means having an input circuit and an output circuit including an inductive impedance to be energized, energy storage means having a first time-constant circuit for control of the wave form of the energizing current supplied to said impedance during a portion of each operating cycle and having a second feed-back current limiting time-constant circuit regeneratively coupling a pulse voltage from said impedance to said input circuit to render said conductance control means self-oscillatory at a cyclic periodicity primarily controlled by said second time-constant circuit, said conductance control means during each cycle of said oscillations providing two controllable operating conditions in one of which energy may be stored by said first time-constant circuit and in the other of which any energy stored by said first time-constant circuit is dissipated, phase control means responsive jointly to said regenerative pulse voltage and to a synchronizing voltage of pulse wave form for controlling at least one steady-state operating potential bias of said conductance control means to control by said other condition thereof the rate of said energy dissipation and thereby provide a secondary phase control over the cyclic periodicity of oscillation, and means for applying to said phase control means a synchronizing signal having appreciable slope of the leading edges of the pulses thereof.

28. A wave-form generator comprising, conductance control means having an input circuit and an output circuit including an inductive impedance to be energized, energy storage means having a first time-constant circuit for control of the wave form of the energizing current supplied to said impedance during a portion of each operating cycle and having a second feed-back current limiting time-constant circuit regeneratively coupling a pulse voltage from said impedance to said input circuit to render said conductance control means self-oscillatory at a cyclic periodicity primarily controlled by said second time-constant circuit, said conductance control means during each cycle of said oscillations providing two controllable operating conditions in one of which energy may be stored by said first time-constant circuit and in the other of which any energy stored by said first time-constant circuit is dissipated, phase control means responsive jointly to said regenerative pulse voltage and to a synchronizing voltage of pulse wave form for controlling at least one steady-state operating potential bias of said conductance control means to control by said other condition thereof the rate of said energy dissipation and thereby provide a secondary phase control over the cyclic periodicity of oscillation, and means for applying to said phase control means a synchronizing signal having synchronizing pulses modified from an approximate rectangular wave form to a stretched-out wave-form of reduced leading-edge slope.

29. A wave-form generator comprising, amplifying means having input and output circuits and including a feedback path comprising resistive and capacitive elements degeneratively coupling said circuits and charged through a charge-limiting resistor from a controlled unidirectional potential source, said amplifying means being biased to be conductively responsive to the charge potential of said degenerative feedback path to energize with a current of saw-tooth wave form a load impedance having resistive and inductive components, means including a capacitive element in parallel with said load impedance for effecting a reversal in polarity in the inductive load energy thereof during a discharge cycle, means including a unidirectional conductive device and series inductor connected from said load impedance to a primary unidirectional potential source of power, said last named means providing the average energizing current required by said load impedance, means comprising a condenser connected from ground potential to the junction of said last named inductor and unidirectional conductance device, said last named condenser having a value selected to provide a change in voltage at said junction equal to the change in voltage across the resistive component of said load impedance during said discharge interval and by control of the conductance of said unidirectional conductive device allowing storage of the inductive load energy during its deenergized period, thereby providing an effective boost potential in the voltage supplied to said load impedance equal in value to the average induced voltage across the inductive component of said load impedance, conductance control means coupled to the junction of said feedback path and said charge-limiting resistor and having a non-conductive state to permit charge of said feedback-path capacitive element during a charge interval and having a relatively low impedance state to effect rapid discharge thereof, and means for controlling said conductance control means alternately to said conductive and non-conductive states thereof at a preselected periodicity.

30. A wave-form generator comprising, amplifying means having input and output circuits and including a feedback path comprising resistive and capacitive elements degeneratively coupling said circuits and charged through a charge-limiting resistor from a controlled unidirectional potential source, said amplifying means being biased to be primarily responsive to the charge potential of said feedback network only during a terminal portion of each trace interval to energize with a current of saw-tooth wave form a load impedance having series resistive and inductive components, means including a capacitive element in parallel to said load impedance for effecting a reversal in polarity of the inductive load energy thereof during a discharge interval, means including a unidirectional conductive device and means exhibiting a negative resistance characteristic at the frequency of operation for providing a voltage equal to the resistive voltage drop across said load impedance and said conductive device, said two last named means being coupled by a storage condenser between said load impedance and a primary unidirectional potential power source and controlling the rate of discharge of the inductive load energy of said load impedance into said storage condenser during an initial portion of said trace interval, thereby to provide an increase in effective voltage across said amplifying means equal to the average voltage developed across the inductive component of said load impedance, conductance control means coupled to the junction of said feedback path and said charge-limiting resistor and having a non-conductive state to permit charge of said feedback-path capacitive element during a charging interval and having a relatively low impedance state to effect rapid discharge thereof, and means for controlling said conductance control means alternately to said conductive and non-conductive states thereof at a preselected periodicity.

References Cited in the file of this patent

UNITED STATES PATENTS

| | | |
|---|---|---|
| 2,248,975 | Faudell | July 15, 1941 |
| 2,545,346 | Edelsohn | Mar. 13, 1951 |
| 2,561,817 | Parker | July 24, 1951 |
| 2,664,521 | Schlesinger | Dec. 29, 1953 |
| 2,742,591 | Proctor | Apr. 17, 1956 |
| 2,754,363 | Nelson | July 10, 1956 |
| 2,761,970 | Owens | Sept. 4, 1956 |
| 2,832,003 | Andrieu | Apr. 22, 1958 |

UNITED STATES PATENT OFFICE

CERTIFICATE OF CORRECTION

Patent No. 2,923,851 February 2, 1960

Clayton A. Washburn

It is hereby certified that error appears in the printed specification of the above numbered patent requiring correction and that the said Letters Patent should read as corrected below.

Column 18, line 53, for "valve" read -- value --; column 21, line 36, strike out "energizing" and insert instead --controlling the dissipation of energy in --; column 23, line 10, after "feed-back" insert -- path --; line 70, for "stage" read -- device --; column 26, line 11, before "feed-back" insert -- and --; line 31, for "each" read -- said --.

Signed and sealed this 16th day of August 1960.

(SEAL)
Attest:

KARL H. AXLINE
Attesting Officer

ROBERT C. WATSON
Commissioner of Patents